(12) United States Patent
Haikin

(10) Patent No.: US 6,757,893 B1
(45) Date of Patent: Jun. 29, 2004

(54) VERSION CONTROL SYSTEM FOR SOFTWARE CODE

(75) Inventor: John S. Haikin, Fremont, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/465,450

(22) Filed: Dec. 17, 1999

(51) Int. Cl.$^7$ ............................................. G06F 9/44
(52) U.S. Cl. ................................................. 717/170
(58) Field of Search ........................................ 717/170

(56) References Cited

U.S. PATENT DOCUMENTS

| | | | | |
|---|---|---|---|---|
| 4,399,504 A | * | 8/1983 | Obermarck et al. | 710/200 |
| 4,809,170 A | | 2/1989 | Leblang et al. | 717/122 |
| 5,175,851 A | * | 12/1992 | Johnson et al. | 707/8 |
| 5,261,100 A | | 11/1993 | Fujinami et al. | 717/122 |
| 5,278,979 A | | 1/1994 | Foster et al. | 707/203 |
| 5,355,477 A | * | 10/1994 | Strickland et al. | 707/8 |
| 5,519,866 A | | 5/1996 | Lawrence et al. | 717/162 |
| 5,623,659 A | * | 4/1997 | Shi et al. | 707/8 |
| 5,623,661 A | * | 4/1997 | Hon | 707/1 |
| 5,671,398 A | * | 9/1997 | Neubauer | 703/23 |
| 5,671,415 A | | 9/1997 | Hossain | 717/101 |
| 5,675,802 A | | 10/1997 | Allen et al. | 717/103 |
| 5,692,178 A | * | 11/1997 | Shaughnessy | 707/8 |
| 5,701,472 A | * | 12/1997 | Koerber et al. | 707/203 |
| 5,706,510 A | * | 1/1998 | Burgoon | 707/203 |
| 5,758,160 A | | 5/1998 | McInerney et al. | 717/104 |
| 5,758,347 A | * | 5/1998 | Lo et al. | 707/103 R |
| 5,764,989 A | | 6/1998 | Gustafsson et al. | 717/129 |
| 5,857,207 A | * | 1/1999 | Lo et al. | 707/203 |
| 5,870,764 A | * | 2/1999 | Lo et al. | 707/203 |
| 5,878,432 A | * | 3/1999 | Misheski et al. | 707/103 R |
| 5,881,292 A | * | 3/1999 | Sigal et al. | 717/170 |
| 5,892,953 A | * | 4/1999 | Bhagria et al. | 717/175 |
| 5,903,897 A | * | 5/1999 | Carrier et al. | 707/203 |
| 6,223,343 B1 | * | 4/2001 | Hopwood et al. | 717/101 |
| 6,226,652 B1 | * | 5/2001 | Percival et al. | 707/203 |
| 6,272,678 B1 | * | 8/2001 | Imachi et al. | 717/122 |
| 6,321,378 B1 | * | 11/2001 | Weber | 717/122 |
| 6,385,767 B1 | * | 5/2002 | Ziebell | 717/170 |
| 6,385,768 B1 | * | 5/2002 | Ziebell | 717/121 |
| 6,457,170 B1 | * | 9/2002 | Boehm et al. | 717/106 |
| 6,594,822 B1 | * | 7/2003 | Schweitz et al. | 717/140 |
| 6,658,660 B1 | * | 12/2003 | Minyard | 717/171 |

FOREIGN PATENT DOCUMENTS

| | | | | |
|---|---|---|---|---|
| DE | 0492071 A2 | * | 7/1991 | ............ G06F/9/44 |
| WO | WO 95/00901 | | 1/1995 | |
| WO | WO 95/00904 | | 1/1995 | |

OTHER PUBLICATIONS

"Web Management with Microsoft Visual SourceSafe 5.0", Steven Banick et al, Que Publishing, pp. 1–247, 1997.*

* cited by examiner

*Primary Examiner*—Todd Ingberg
(74) *Attorney, Agent, or Firm*—Fitzpatrick, Cella, Harper & Scinto

(57) ABSTRACT

A software source code version control system for use during the development and maintenance of the software source code by multiple software developers in which historical version tracking is provided by maintaining the source code on a line-by-line basis in a source code storage, in which multiple versions of each source code line are stored in the source code storage, wherein each version has a corresponding version code and user code, thereby providing concurrent access to the software source code lines by multiple software developers for modification.

100 Claims, 12 Drawing Sheets

VERSION CONTROL SYSTEM FOR SOFTWARE CODE

BACKGROUND OF THE INVENTION

1. Field of the Invention

The present invention concerns a system for maintaining versions of software source code. More specifically, the present invention provides a system for use by software developers during the development and maintenance of the software source code of a software system, whereby modified versions of the software source code are tracked and stored on a line-by-line basis within a source code storage. Because modified versions of the software source code are tracked and stored on a line-by-line basis, it is possible for multiple software developers to work on the same software source code at the same time, while still providing historical version tracking of all modifications to each of the source code lines.

2. Description of the Related Art

Development of a software system typically involves the authoring of a large number of lines of software source code which are typically arranged into one or more files wherein each file contains several source code lines. The source code files are compiled or translated from the programming language in which they were written into machine-language objects which are then linked together to form a cohesive executable program for execution on a computer.

Typically, the source code files that comprise a software system are stored within the memory of one or more computers or file servers during the development, maintenance and upgrade of the software system. Software developers using workstations in a networked environment edit the source code as needed during development to implement the objectives and design requirements for the software system, to fix errors ("bugs"), and to make upgrades or enhancements. The edited source code files are then used to re-build the software system, thereby incorporating the changes and modifications made by the software developers. Tracking of both edited and non-edited source code is therefore desirable in order to ensure that all changes and modifications are eventually completed, and to ensure that changes can be backed out if they introduce errors.

The tracking of software source code becomes much more critical during development of a large-scale, complex software system by multiple software developers in a distributed software development system comprising numerous computing devices within a network environment. Currently, several types of software management tools are available to assist software developers during the development of software systems. Computer-Aided Software Engineering (CASE) tools are typically used in large-scale, complex software system development projects to provide configuration management and version control of the software source code that comprises the software system. Examples of current CASE tools that provide version control include, among others, Revision Control System (RCS) and Source Code Control System (SCCS) for use in UNIX-based computing environments, and Program Version Control System (PVCS) and Microsoft's SourceSafe™ for use in DOS- or Windows-based computer environments.

The typical prior art version control tool, such as those mentioned above, generally provides the ability to track the versions of software source code from its inception to its current state, including all versions in between. A new version of the source code is generally created after a set of modifications and/or additions have been made to the previously existing source code files. Known version control tools generally maintain and track modifications to software source code by establishing and tracking multiple versions of the individual software files that comprise the software source code during the development process.

Version control according to these known tools generally consists of four major functions. First, a software system library is maintained for storing a master copy of all software source code files that comprise the software system. Second, access to the individual source code files is controlled by allowing each particular source code file to be checked-out to only one software developer at a time for modifications, thereby providing a local copy of the source code file to the software developer's workstation for editing as needed. While the source code file is checked-out to one of the software developers, other software developers are locked-out and prevented from making any changes to the source code file, although they are able to read the unedited master copy of the source code file from the software system library. This lock-out mechanism prevents subsequent problems that would arise during check-in of the source code file if more than one software developer had made changes to the same source code file at the same time. Third, modifications are introduced to the master copy of the source code file from the local copy of the source code file that was edited by the software developer who checked-out the source code file. Fourth, version tracking of each of the source code files is maintained pursuant to one of two methods. In the first method, an entire copy of the modified source code file is saved to the master copy in the library and is given a new version number. In the second method, only the modifications that were made from the prior master copy are saved, such that only those modifications that were made by the software developer to the checked-out source code file are saved in the software system library, along with a corresponding new version number. In this method, a particular version of a source code file is subsequently obtained by accessing the original master copy and then applying all of the changes corresponding to each version of the source code file that was created since the original master copy.

Although the known version control tools for file-based source code provide the capability for historical version tracking of modifications made to each source code file, several drawbacks and adverse consequences arise when developing a software system using such version control tools in a multiple software developer environment. First, the memory storage space that is needed to store multiple complete versions for each source code file grows unmanageably large when developing a large, complex software system in a multiple software developer environment.

Second, the lock-out mechanism utilized by traditional version control tools operates on a file-by-file basis, thereby preventing other software developers from working on a source code file that has been checked out, even though a single source code file may contain several routines, functions, and source code lines that are not being modified by the software developer who checked-out the source code file. Thus, all other software developers that have unrelated changes to make within the checked-out file must wait until the source code file is checked-in before proceeding to make their changes to the source code file. Development of a source code file under traditional version control is therefore performed in a sequential rather than concurrent manner, thereby resulting in the introduction of significant delays into the development process. In addition, since all other software developers have read-only access to the unedited master copy of the source code file while it is checked out, they cannot access the modifications that were incorporated in the checked-out source code file in order to determine if the modifications will adversely affect their respective development efforts.

Third, a file-based version control system does not provide functional version tracking for a set of related changes that are made by a software developer to certain sections of several source code files in order to implement a functional change or modification into the overall software system.

Fourth, a version control system which saves only the changes made to each source code file does not provide quick and transparent access to a specific version of a software file because it must first implement a source code file rebuild process which sequentially applies each interim version of saved modifications of the source code file to the original master copy of the source code file, thereby creating the requested specific version of the source code file.

SUMMARY OF THE INVENTION

The present invention addresses the foregoing problems by providing a software source code version control system for use during the development and maintenance of a software system by multiple software developers in which historical version tracking is maintained for all source code on a line-by-line basis without requiring excessive storage area, in which source code can be accessed and modified by more than one software developer at a time, in which historical version tracking of broad functional changes is provided, and in which quick and transparent access is provided to each version of the source code.

Specifically, a first embodiment of the present invention is directed to a method for version control of source code arranged into a plurality of source code lines. The plurality of source code lines are maintained within a computer device having a memory. The computer device is accessible to a plurality of software developers. The method includes accessing, in response to an access request, at least one of the plurality of source code lines, wherein the plurality of source code lines are stored within a source code storage which is located within the memory. The source code storage is arranged to store a plurality of versions of each of the plurality of source code lines. A copy of at least one of the plurality of versions of the accessed source code lines is generated in response to the access request, and at least one edited source code line is received. The method further includes storing, in the source code storage, a new version of source code line corresponding to each of the edited source code lines received.

Preferably, each version of each source code line is stored in a particular memory location of the source code storage. Version control is maintained by storing an initial version of each source code line and by creating a new version of a particular source code line every time the particular source code line is accessed and edited by a software developer. Specifically, each new version of a particular source code line has a corresponding pointer which points to the memory location of the previous version of the particular source code line from which the new version of the source code line was created. A linked pointer structure is thereby provided in the source code storage which continues to grow as the source code lines are continuously accessed and edited by the software developers. In this manner, the linked pointer structure provides historical version tracking of each of the source code lines.

In another aspect of the present embodiment, each version of each source code line has a corresponding version code, which is stored in the source code storage, that identifies the version of the source code line. Preferably, the version code identifies the version of the source code line to which the version corresponds as a successor version of a previous version of the same source code line or as an initial version of the source code line.

In another aspect, each version of each source code line has a corresponding user code, which is stored in the source code storage, that contains information describing at least one of the software developers. Preferably, the user code identifies those software developers that are allowed to access and edit the version of the source code line to which the user code corresponds. In the case that a new version of a source code line is created corresponding to a source code line that has been accessed and edited by a software developer, the information contained in the user code corresponding to the new version preferably describes the software developer that accessed and edited the source code line.

In a further aspect of the present embodiment, each version of each source code line is stored in the source code storage in a compressed, canonical and format independent form in order to reduce storage requirements for the source code storage. The source code lines are then subsequently expanded to an uncompressed and non-canonical form when they are accessed from the source code storage for editing by the software developers.

According to a further aspect, a plurality of virtual files are stored within the source code storage, wherein each virtual file contains a plurality of line references and each line reference corresponds to one of the plurality of source code lines. The source code storage is arranged to store a plurality of versions of each of the plurality of virtual files. Preferably, a requesting software developer can be sent a copy of a version of each source code line that corresponds to each line reference that is contained in a particular virtual file.

In yet another aspect of the present embodiment, when a software developer has completed and saved a set of modified source code lines and/or newly created source code lines, the software developer can request integration of those versions of source code lines that are saved in the source code storage. The integration of the versions of source code lines creates integrated, official versions of the source code lines for access by all software developers. The user code for each version of source code line that is selected for integration is modified to allow access by all software developers. In addition, the version code for each version of source code line that is selected for integration is also modified to indicate that the version is now an integrated, official version. Preferably, integration of a specific version of a source code line is not performed if more than one software developer has modified and saved a version of that same source code line since either the previous integrated version of the source code line or the initial version of the source code line, whichever is most recent. In such a situation, the software developers are notified of the situation so that they can resolve any differences between their respective modified versions of the same source code lines.

Another embodiment of the present invention provides for a method for editing source- code which is arranged into a plurality of source code lines which are stored in a source code storage. The source code storage is arranged to store a plurality of versions of each of the plurality of source code lines, and is accessible to a plurality of software developers. The method includes sending an access request to the source code storage. The access request contains a reference to at least one of the plurality of source code lines stored in the source code storage. A copy of at least one of the plurality of versions of each source code line referenced in the access request is received from the source code storage, in response to the access request. Each copied version is received in an uncompressed, non-canonical format. At least one of the copied versions of source code lines received from the source code storage is modified, thereby creating at least one edited source code line, and the at least one edited source code lines is sent to the source code storage.

In another aspect of this embodiment, the software developer receives the most recently integrated official version, or the initial version if no subsequent integrated version exists, of each requested source code line from the source code storage. In the alternative, the software developer may receive the most recent version of each requested source code line that was previously modified and saved by the requesting software developer.

According to another embodiment, a special editor is provided so that the software developer may send an access request containing a reference to a virtual file which contains references to source code lines. The software developer then transparently receives a copy of a version of each source code line that is referenced in the virtual file. Preferably, the version of each source code line which is copied and provided to the software developer is the most recently saved version that was modified by the requesting software programmer, or, if no such version exists, the most recently integrated version, or, if no such version exists, the initial version, in that respective order. It can therefore be appreciated that a second software developer may transparently receive a different set of copied source code line versions when using a copy request which references the same virtual file because the second software developer could be provided with the most recent version of the source code lines that were modified by the second software developer, instead of the version of the source code lines that were modified by the first software developer. Thus, multiple software developers can concurrently access and modify the same source code lines referenced in a virtual file, thereby preventing substantial delays during development that are otherwise encountered by a file-based lock-out mechanism that is utilized in traditional file-based version control systems.

In yet another aspect, the special editor allows a requesting software developer to view any version of any source code line, including prior versions that reflect modifications made either by the requesting software developer or by another software developer. In this manner, each of the software developers can see what the other software developers are currently doing in order to coordinate their development efforts and to ensure that modifications made by one particular software developer will not adversely impact the development efforts of other software developers. The special editor can also allow a software developer to access, modify, save and integrate versions of virtual files, virtual objects, and symbol tables in a manner similar to that described above regarding source code lines.

The version control system of the present invention therefore creates new versions for only those source code lines that have been modified or newly created, thereby saving memory space in comparison to traditional file-based version control systems in which a new version of an entire file is saved whenever there is a change to source code within the source code file, no matter how small the change. Furthermore, the version control system of the present invention allows software developers to work together in a coordinated fashion to access, modify and integrate, in a controlled fashion, the versions of source code lines that are stored in the source code storage. It should be noted that the version control system of the present invention is not limited to use in the development, maintenance and control of software source code, but also can be used for version control of other line-based computer data, such as text-based data in a large-scale, multi-author, distributed development environment like a newspaper publishing system, or other similar development environment.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

The present invention is generally directed to a line-based version control system for storing and tracking multiple versions of source code lines. In the preferred embodiment, the invention is used in a distributed network environment wherein the source code lines are stored and maintained on a server and are accessible for editing via multiple workstations. Similarly, the invention can be used in other computing environments, including a stand-alone personal computer or the like. In the preferred embodiment, the present invention is utilized to store and track source code lines of a large software system. However, the present invention can also be utilized to store and track lines of text or data of a large publishing or data system, respectively.

Figure 1:
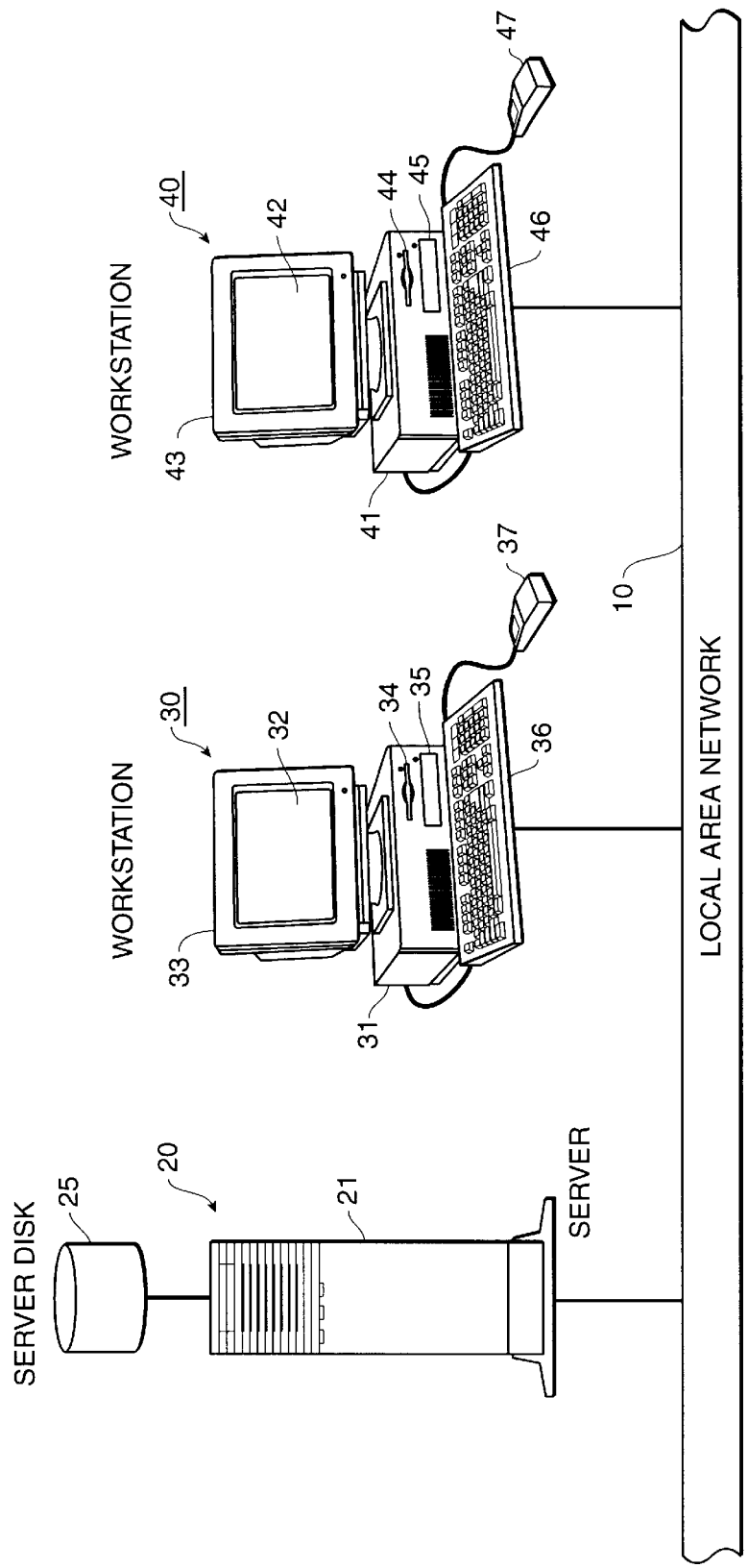
FIG. 1 is a representative view of a networked computing environment in which the present invention may be implemented according to the invention.

FIG. 1 provides an overall system view of a networked computing environment that includes computers, peripherals and related devices. The network comprises a local area network (LAN) 10, a plurality of computers, and a plurality of peripherals and related devices connected to the computers. LAN 10 is preferably an Ethernet network medium consisting of a bus-type physical architecture, although the invention can be utilized over other types of networks, including the Internet. The computers depicted in FIG. 1 include a personal computer (PC) which acts as server 20, and also includes workstation 30 and workstation 40, each of which is capable of communicating with server 20 via LAN 10.

Server 20 includes host processor 21 which comprises a personal computer (hereinafter "PC"), preferably an IBM PC-compatible computer having a windowing environment such as Microsoft Windows 95, Windows 98 or Windows NT. Server 20 also includes a computer-readable memory medium comprised of server disk 25 which is preferably a fixed disk and which provides shared access to workstations 30 and 40 via LAN 10 by utilization of supporting software in host processor 21. Server 20 may also include a floppy disk drive (not shown) whereby server 20 can access information, such as data, application programs, etc. stored on removable memory media. Similarly, a CD-ROM interface (not shown) may be provided for server 20 through which information stored on removable CD-ROM media can be accessed. Preferably, server 20 is accessed and maintained through one of the workstations on LAN 10, although server 20 could also be accessed and maintained through a locally attached monitor, keyboard and pointing device (none of which are shown).

Workstation 30 and workstation 40 are both workstations of similar configuration and therefore only workstation 30 will be described herein for the sake of brevity. Workstation 30 includes host processor 31 which comprises a personal computer (hereinafter "PC"), preferably an IBM PC-compatible computer having a windowing environment such as Microsoft Windows 95, Windows 98 or Windows NT. Provided with workstation 30 are display 33 including display screen 32, keyboard 36 for entering text data and user commands, and pointing device 37. Pointing device 37 preferably comprises a mouse for pointing and for manipulating objects displayed on display screen 32.

Workstation 30 also includes a computer-readable memory medium such as fixed disk 35 and/or floppy disk drive 34. Floppy disk drive 34 provides a means whereby workstation 30 can access information, such as data, application programs, etc. stored on removable memory media. Similarly, a CD-ROM interface (not shown) may be provided for workstation 30 through which information stored on removable CD-ROM media can be accessed. As mentioned above, workstation 40 contains similarly-numbered components to those of workstation 30.

Figure 2:
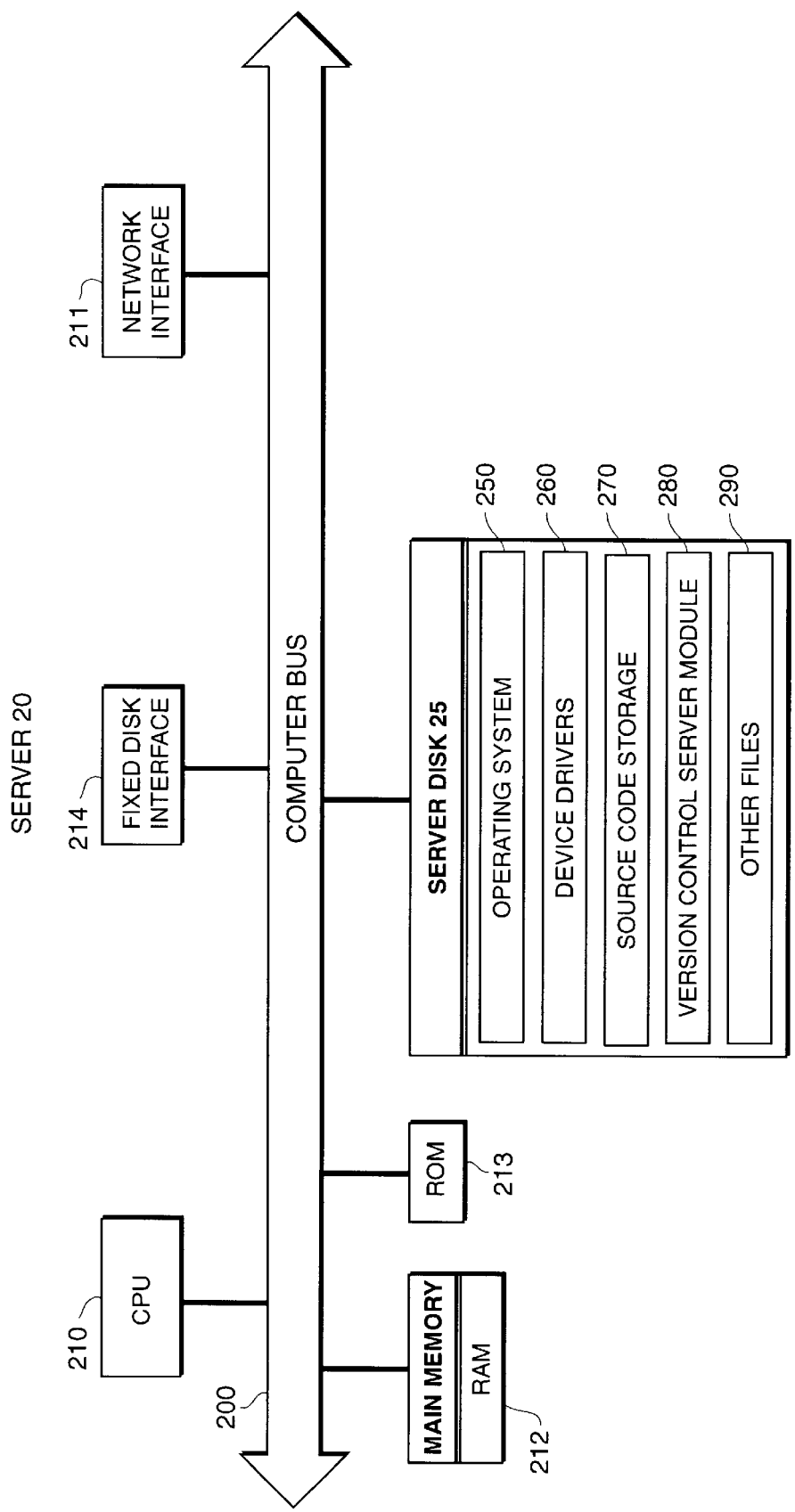
FIG. 2 is a detailed block diagram showing the internal architecture of the server shown in the networked computing environment of FIG. 1 according to the invention.

FIG. 2 is a block diagram showing an overview of the internal architecture of server 20. In FIG. 2, host processor 21 of server 20 includes a central processing unit ("CPU") 210 such as a programmable microprocessor interfaced to computer bus 200. Also coupled to computer bus 200 is network interface 211 for interfacing to LAN 10, network interface 211 preferably comprising an Ethernet compatible network interface device such as a network interface card. In addition, fixed disk interface 214 is also coupled to computer bus 200 for interfacing to server disk 25. Random access memory ("RAM") 212 interfaces to computer bus 200 to provide CPU 210 with access to memory storage, thereby acting as the main run-time memory for CPU 210. In particular, when executing stored program instruction sequences, CPU 210 loads those instruction sequences from server disk 25 (or other memory media such as computer readable media accessed via an unshown network interface) into RAM 212 and executes those stored program instruction sequences out of RAM 212. It should also be recognized that standard disk-swapping techniques available under windowing operating systems allow segments of memory to be swapped to and from RAM 212 from server disk 25. Read only memory ("ROM") 213 in server 20 stores invariant instruction sequences, such as start-up instruction sequences for CPU 210 or basic input/output operating system ("BIOS") sequences.

Server disk 25 is one example of a computer readable medium that stores program instruction sequences executable by CPU 210 so as to constitute operating system 250, device drivers 260, source code storage 270, version control server module 280, and other files 290 which may include data files or application programs. As mentioned above, operating system 250 is preferably a windowing operating system, although other types of operating systems may be used with the present invention. At least one of device drivers 260 comprises a network interface driver which provides a software interface to network interface 211. Source code storage 270 is used to store software source code lines and other related data structures and entities according to the practice of the present invention and is described more fully below. Version control server module 280 provides the server functionality of the version control system of the present invention to store, maintain and track the versions of the software source code lines stored in source code storage 270. The data files and/or application programs in other files 290 are provided to support the operation and maintenance of server 20 and/or other functionality provided in server 20.

Figure 3:
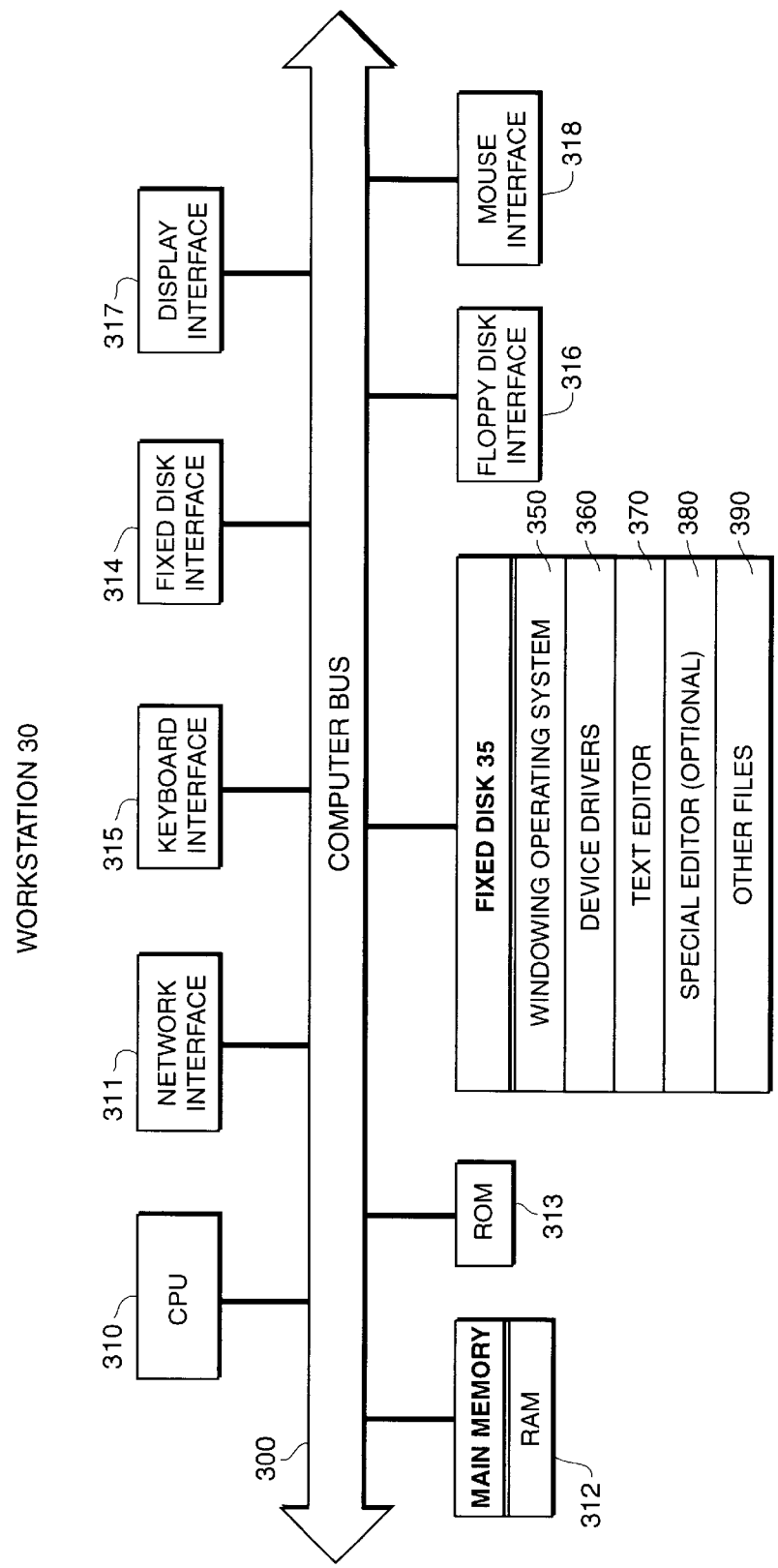
FIG. 3 is a detailed block diagram showing the internal architecture of a workstation shown in the networked computing environment of FIG. 1 according to the invention.

FIG. 3 is a block diagram showing an overview of the internal architecture of workstation 30. In FIG. 3, host processor 31 of server 30 includes a central processing unit ("CPU") 310 such as a programmable microprocessor interfaced to computer bus 300. Also coupled to computer bus 300 are display interface 317 for interfacing to display 33, floppy disk interface 316 for interfacing to floppy disk drive 34, keyboard interface 315 for interfacing to keyboard 36, mouse device interface 318 for interfacing to pointing device 37, fixed disk interface 314 for interfacing to fixed disk 35, and network interface 311 for interfacing workstation 30 to LAN 10. Network interface 311 preferably comprises an Ethernet compatible network interface device such as a network interface card.

Random access memory ("RAM") 312 interfaces to computer bus 300 to provide CPU 310 with access to memory storage, thereby acting as the main run-time memory for CPU 310. In particular, when executing stored program instruction sequences, CPU 310 loads those instruction sequences from fixed disk 35 (or other memory media such as computer readable media accessed via an unshown network interface) into RAM 312 and executes those stored program instruction sequences out of RAM 312. It should also be recognized that standard disk-swapping techniques available under windowing operating systems allow segments of memory to be swapped to and from RAM 312 from fixed disk 35. Read only memory ("ROM") 313 in server 30 stores invariant instruction sequences, such as start-up instruction sequences for CPU 310 or basic input/output operating system ("BIOS") sequences for operation of keyboard 36.

Fixed disk 35 is one example of a computer readable medium that stores program instruction sequences executable by CPU 310 so as to constitute operating system 350, device drivers 360, text editor 370, special editor (optional) 380, and other files 390 which may include data files or application programs. As mentioned above, operating system 350 is preferably a windowing operating system, although other types of operating systems may be used with the present invention. Device drivers 360 preferably includes a driver for each of the aforementioned interfaces which are coupled to computer bus 300. Text editor 370 is a typical editor application for editing text-based files, and can be used to edit a file containing copies of source code lines. Special editor 380 allows the workstation to retrieve and edit selected versions of the software source code lines which are stored in source code storage 270 of server 20. Special editor 380 also allows the workstation to access and edit selected versions of virtual files, virtual objects and symbol tables as discussed more fully below. The data files and/or application programs in other files 390 are provided to support the operation and maintenance of workstation 30 and/or other functionality provided in workstation 30.

Figure 4:
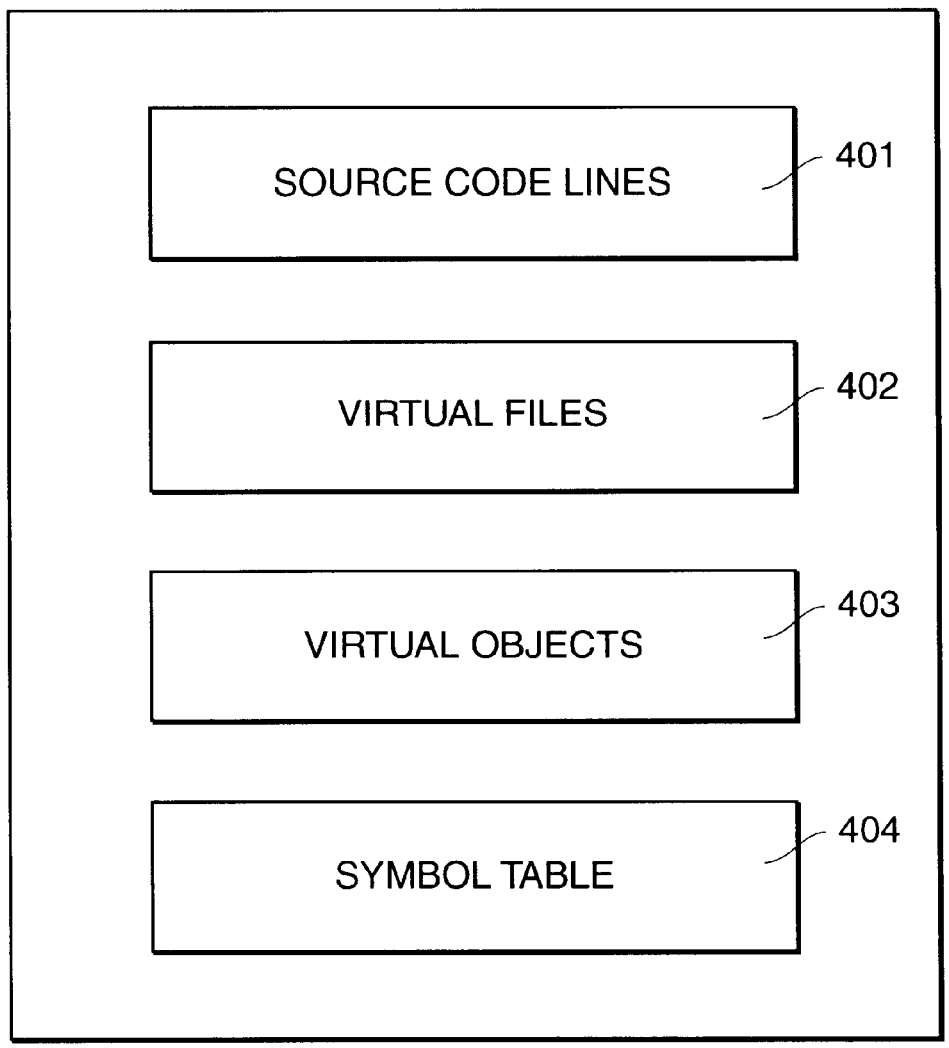
FIG. 4 is a block diagram for explaining the content of the source code storage shown in FIG. 2 according to the invention.

FIG. 4 is a block diagram for explaining the content of source code storage 270 which is maintained on server disk 25 of server 20. As illustrated in FIG. 4, source code storage 70 is comprised of separate storage areas for source code lines 401, virtual files 402, virtual objects 403, and symbol table 404. Therefore, source code storage 270 provides a single comprehensive memory storage area for storing and maintaining all source code lines 401, and the means for organizing, accessing and maintaining source code lines 401 through the use of virtual files 402, virtual objects 403, and symbol table 404.

Figure 5:
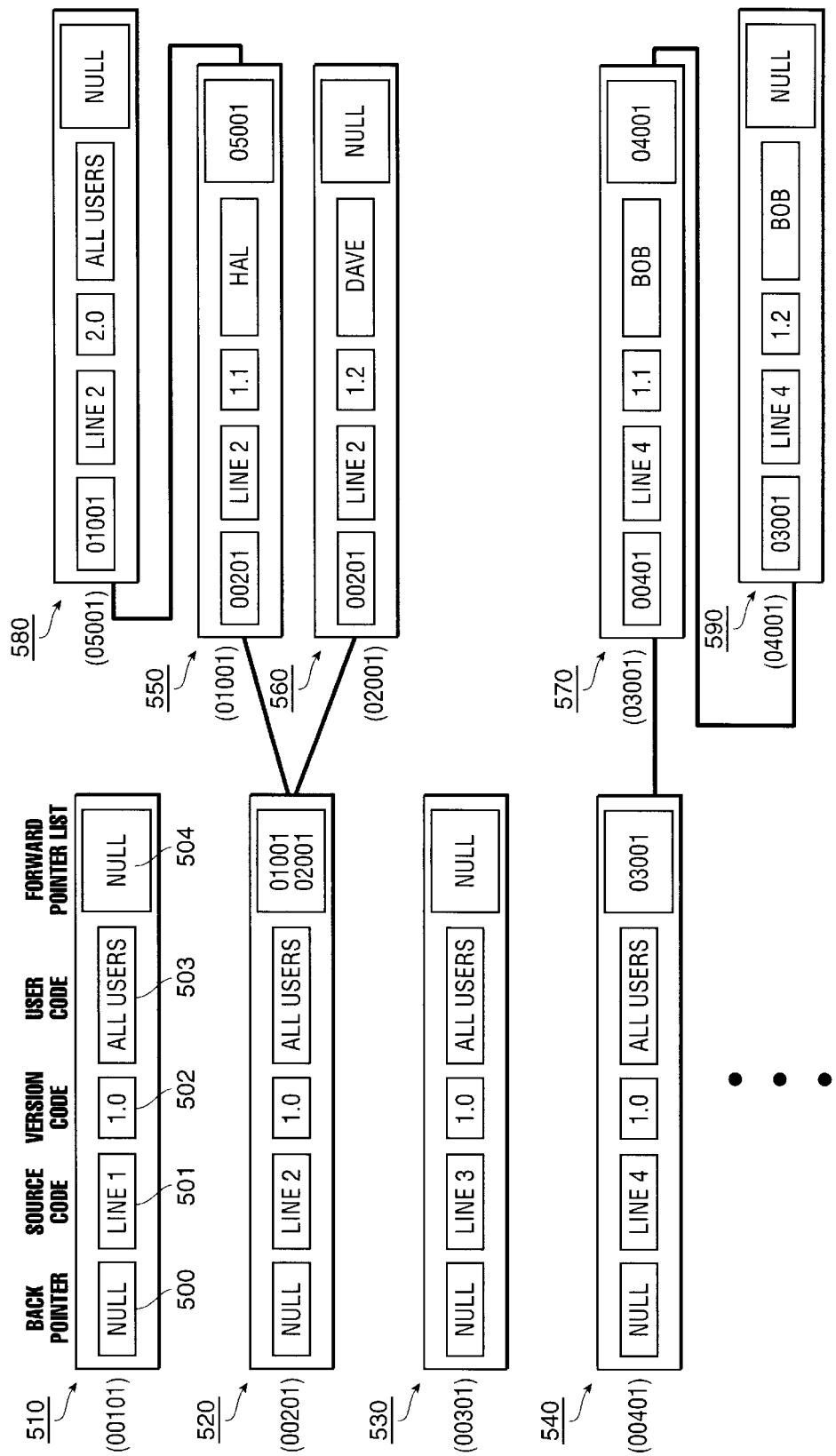
FIG. 5 is a view for explaining the structure and organization of the source code lines shown in FIG. 4 according to the invention.

In more detail, FIG. 5 illustrates more fully the structure and organization of source code lines 401 stored in source code storage 270. As can be seen in FIG. 5, source code lines 401 are each stored separately in the memory area of source storage 270 as opposed to the traditional file-based manner in which source code lines are stored collectively in traditional source code files. As depicted in FIG. 5, each of source code lines 401 are stored separately at an individual address location in source code storage 170. For instance, source code line version (510) is stored at address location "00101" and is the initial version of "line 1" of source code lines 401. Source code line version 510 is comprised of source code 501, in addition to other information related to source code 501, such as version code 502 and user code 503, as well as pointers to the next subsequent version and to the immediately-preceding version of source code 501.

Source code 501 in each of source code lines 401 is preferably stored in a compressed, canonical format. In this format, the empty spaces taken up by indents, tabs and blank character spaces are replaced by a canonical code. For instance, an indent might be replaced by the code OA, a tab might be replaced by the code OB, and a series of five blank spaces might be replaced by the code 5C. Of course, many other implementations of this canonizing process are possible. In a further effort to compress source code lines 401, symbol table 404 is used to replace each word and symbol contained in source code lines 401 with a corresponding, unique numeric reference. The numeric reference takes up less space than the corresponding word or symbol. Accordingly, less storage space is needed to store source code lines 401, and less time is needed to transfer one or more of source code lines 401 over LAN 10.

Back pointer 500 of each version contains a memory address location which points to the immediately-preceding version from which the current version was derived. In the case of version 510, the memory address value of back pointer 500 is null because version 510 is the initial version of "line 1" and, therefore, no previous version exists. In addition, version code 502 is provided for each version of source code lines 401 so as to uniquely identify each particular version of the same source code line. In the preferred mode, version code 502 is a numeric code and is incremented in a chronologically-sequential fashion for each subsequent version of each of source code lines 401. Also, in the preferred mode, version code 502 indicates whether or not the version to which it corresponds is an integrated "official" version of source code line, which is a version of source code line that is considered to be reliable source code, is made accessible to all users, and is utilized during compiling of source code lines 401.

As can be seen in FIG. 5, version code 502 for version 510 has a value of "1.0" which indicates that this is the initial version of "line 1" because, in the preferred mode, a version code ending in "0.0" indicates an integrated "official" version. In addition to a version code, each version of source code lines 401 also has user code 503 which indicates the user on the networked computing environment who is normally allowed access to view and edit that particular version. Each version of source code line also has forward pointer list 504 which contains one or more memory address locations corresponding to each subsequent version that is derived from the present version. As can be seen by user code 503, the value "all users" is provided for version 510 which indicates that all users of the networked computing environment are allowed to access and edit this version. The manner by which a user (software developer) can access and edit a version of source code line is described in further detail below.

In the preferred embodiment, a user code having the value "all users" is provided for each integrated "official" source code line. If, instead, a version of source code lines 401 is a "working version", then user code 503 contains only the name of the particular user who modified that version. In this manner, access to each version of source code lines 401 is controlled so that all users have access to integrated "official" versions of source code lines 401, but a version that has been modified by a particular user but not yet integrated as an "official" version can only be accessed by that particular user. Lastly, each version of source code lines 401 also contains forward pointer list 504 which points to each subsequent version which is derived from the current version.

As can be seen in FIG. 5, versions 510, 520, 530 and 540 represent the initial versions of source lines 1 through 4 and are each stored at their separate memory address locations of "00101", "00201", "00301" and "00401", respectively. When a particular version of source code lines 401 is accessed and edited by a user, a new version of the source code line is created and version code 502 and user code 503 which correspond to that new version are updated identify that particular version. In addition, the preceding version from which the modified version was derived is updated in order to point to the subsequent, modified version. For example, version 520 in FIG. 5 depicts the initial version of source code line 2, and versions 550 and 560 represent subsequent, modified versions of the initial version 520. In particular, the information contained in version 550 indicates that version 550 was derived from the initial version of line 2 of version 520, because the back pointer 500 of version 550 contains the value "00201" which is the memory address location of version 520. Therefore, source code 501 of version 550 contains modified source code 501 from version 520. Version code 502 of version 550 contains the value "1.1" which indicates that this is a modified, but not yet integrated, version of source code lines 401 which was derived from earlier version 1.0.

In addition, user code 503 of version 550 indicates that this version of source code line was modified by a user named "Hal", and the forward pointer list 504 of version 550 has a value of "05001" which indicates that subsequent version 580 was derived from version 550. Similarly, version 560 also indicates that it was derived from version 520. User code 503 of version .560 indicates that version 560 was modified by a user named "Dave", and version code 502 indicates that version 560 was created after version 550 because version code 502 of version 560 contains the value "1.2", which is a higher sequential value than "1.1" which is contained in version code 502 version 550. Version 560 has a "null" value in its forward pointer list 504, indicating that there are currently no subsequent versions which were derived from version 560.

Thus, it can be appreciated that multiple versions of each one of source code lines 401 are maintained and organized in a linked chronological fashion so that historical version tracking is provided for each individual source code line. It can also be appreciated that this manner of organizing and storing source code lines 401 is more efficient than traditional file-based version control systems in which a new version of an entire file is saved every time the file is modified. According to the present invention, only those source code lines that have been modified are saved to a new version, thereby avoiding wasted memory space associated with storing new versions of source code lines even when those source code lines have not been modified. It can also be appreciated that the present invention controls access to the versions of source code lines 401 on a line-by-line basis, wherein access to each version of source code lines 401 is controlled pursuant to user code 503 that is associated with each version. Therefore, unlike traditional file-based version control systems, wherein a large group of source code lines contained in a traditional file are locked up by one user who is doing development on that file, the present invention allows for concurrent access and modification to source code lines 401.

Turning again to FIG. 5, it can be seen that version 540, the initial version of line 4, has been modified twice by a user named "Bob" as indicated by two subsequent versions 570 and 590. In addition, it can be seen that version 550, which is the version of line 2 which was modified by Hal, has a subsequent version 580. Version 580 is the second integrated "official" version of source code line 21 as indicated by its version code 502. Specifically, back pointer 500 of version 580 indicates that this new "official" version of line 2 was derived from version 550 because it contains the value "01001" which is the memory address location of version 550. Forward pointer list 504 of version 580 contains a "null" value which indicates that there are currently no subsequent versions which were derived from version 580. The manner in which a particular version of source code line is integrated as an "official" version is discussed further below.

The linked structure of source code lines 401 as described above therefore provides an efficient and organized mechanism for maintaining and accessing each particular version of source code lines 401 such that multiple users can access and modify each "official" version of source code lines 401 and can also access and modify those interim "working versions" of source code lines 401 to which they are allowed access pursuant to corresponding user code 503.

In addition to source code lines 401, the preferred embodiment of the present invention also includes additional data structures which act as software development tools in order to provide users with mechanisms for transparently grouping sets of source code lines 401 based on their functionality and relevance, thereby providing users with an efficient means to organize and access groups of functionally related source code lines 401.

Figure 6:
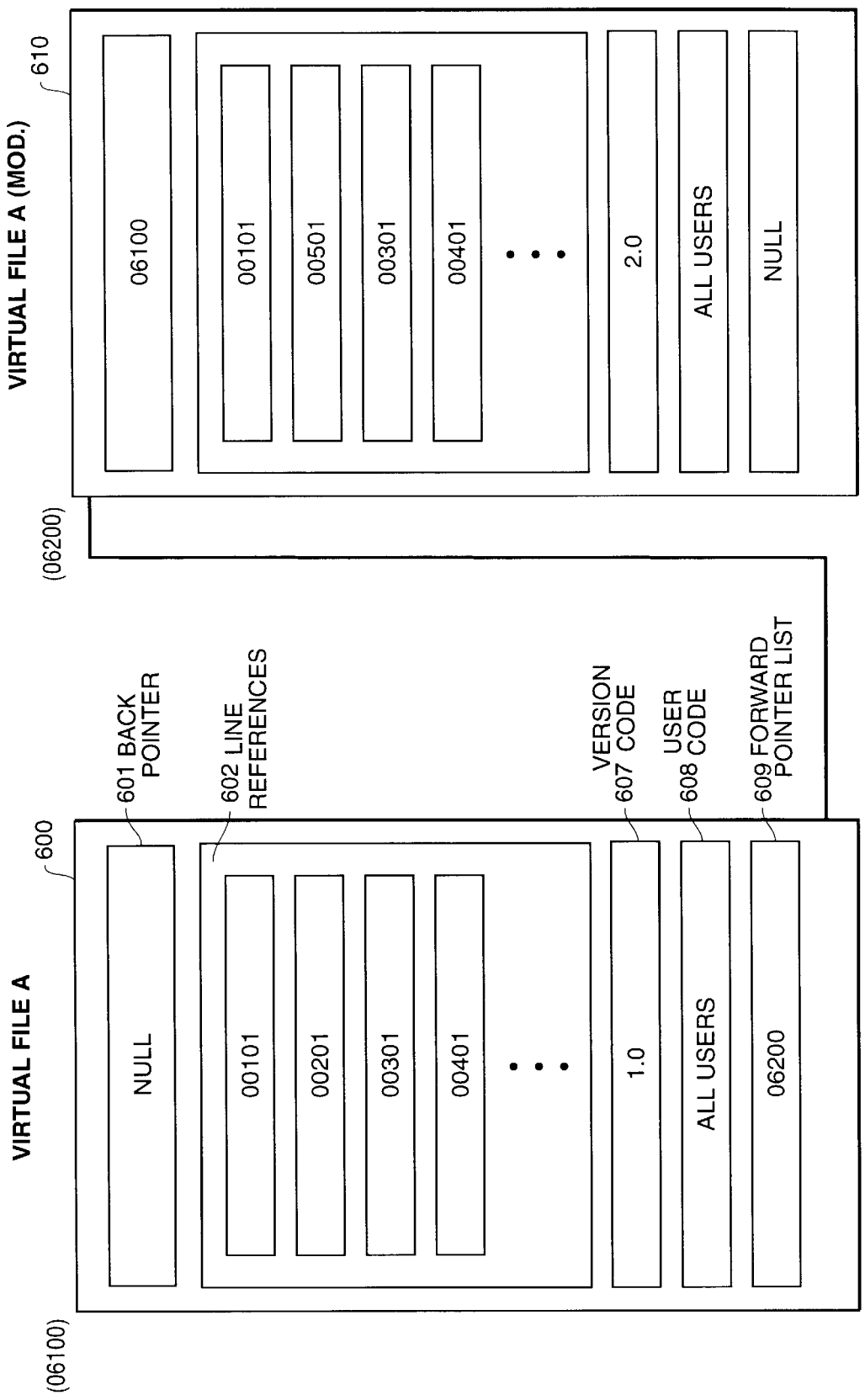
FIG. 6 is a block diagram for explaining the structure and organization of the virtual files shown in FIG. 4 according to the invention.

FIG. 6 is a block diagram which illustrates an example of virtual files 402 which are stored in source code storage 270 of server 20. Specifically, a virtual file is a means of grouping a particular set of source code lines 401 based on their related functionality, thereby providing a tool for users engaged in software development and maintenance to abstractly organize and access source code lines 401. In the present invention, a user can access and modify versions of source code lines 401 by simply referencing their respective memory address locations. In the preferred embodiment, virtual files 402 also can be utilized by a user to provide the user with a more traditional mechanism to organize and access related groups of source code lines 401. Thus, the use of a virtual file provides the user with the transparent perception that the user is working with a traditional file-based version control system, when in fact a line-based version control system is being used. In general, each one of virtual files 402 is simply a collection of line references each of which contains a memory address location pointing to a corresponding one of source code lines 401. In this manner, a user can access and modify a related group of source code lines referenced in one of virtual files 402 simply by referencing the virtual file. Similar to source code lines 401, multiple versions for each of virtual files 402 are maintained, thereby providing historical version tracking of each one of virtual files 402 and controlling access to each version of virtual files 402.

Returning to FIG. 6, version 600 is the initial version of virtual file A, one of virtual files 402. Version 600 is located at memory address location "06100". As mentioned above, version 600 of virtual file A is comprised of line references 602 each of which contains the value of a memory address location, thereby pointing to a particular version of one of source code lines 401. Similar to source code lines 401, each version of virtual files 402 contains back pointer 601 which points to the preceding version from which the present version was derived. In this example, back pointer 601 of version 600 has the value of "null" which indicates that version 600 is the initial version of virtual file A. Also, each version of virtual files 402 contains version code 607, user code 608 and forward pointer list 609 which act in a manner similar to their respective counterparts in source code lines 401. In this example, version code 607 of version 600 has a value of "1.0" which indicates that version 600 is an integrated "official" version of virtual file A. In addition, user code 608 of version 600 has the value "all users" which indicates that version 600 may be accessed and modified by all users. Lastly, forward pointer list 609 of version 600 contains the value "06200", which points to the memory address location of subsequent version 610 of virtual file A which was derived from version 600.

Version 610 of virtual file A is an example of a modified and integrated version derived from version 600 of virtual file A. Specifically, back pointer 601 of version 610 contains the value "06100" which points to version 600 as the predecessor version from which version 610 was derived. In addition, version code 607 of version 610 has the value "2.0" which indicates that this is the second integrated "official" version of virtual file A. In accordance with version 610 being an "official" version, user code 608 of version 600 has the value "all users" to indicate that this "official" version can be accessed and modified by all users in the networked computing environment. Lastly, forward pointer list 609 of version 610 has the value "null", indicating that there are no subsequent versions of virtual file A which were derived from version 610. Versions 600 and 610 of virtual file A are merely examples of multiple versions of one of virtual files 402; however, it should be noted that source code storage 270 is capable of storing and maintaining numerous different virtual files 402, each of which can have numerous different versions.

It can therefore be appreciated that virtual files 402 provide the user with the transparent perception of working with a traditional file, when in fact virtual files 402 are merely mechanisms for abstractly grouping pointers to a plurality of source code lines 401 which have some common functionality or relationship. It can also be appreciated that, in the preferred embodiment, a user also may access and edit each of virtual files 402 so as to add, remove or reorganize the line references therein. For instance, the second of line references 602 in version 610 of virtual file A has been changed from the value "00201" to the value "00501", thereby changing the perceived second source code line of virtual file A to a different version of one of source code lines 401.

Virtual files 402 therefore also provide a convenient means for ordering source code lines 401 for subsequent compilation and execution, thereby providing functional, coordinated software programs comprising an operational software system.

Figure 7:
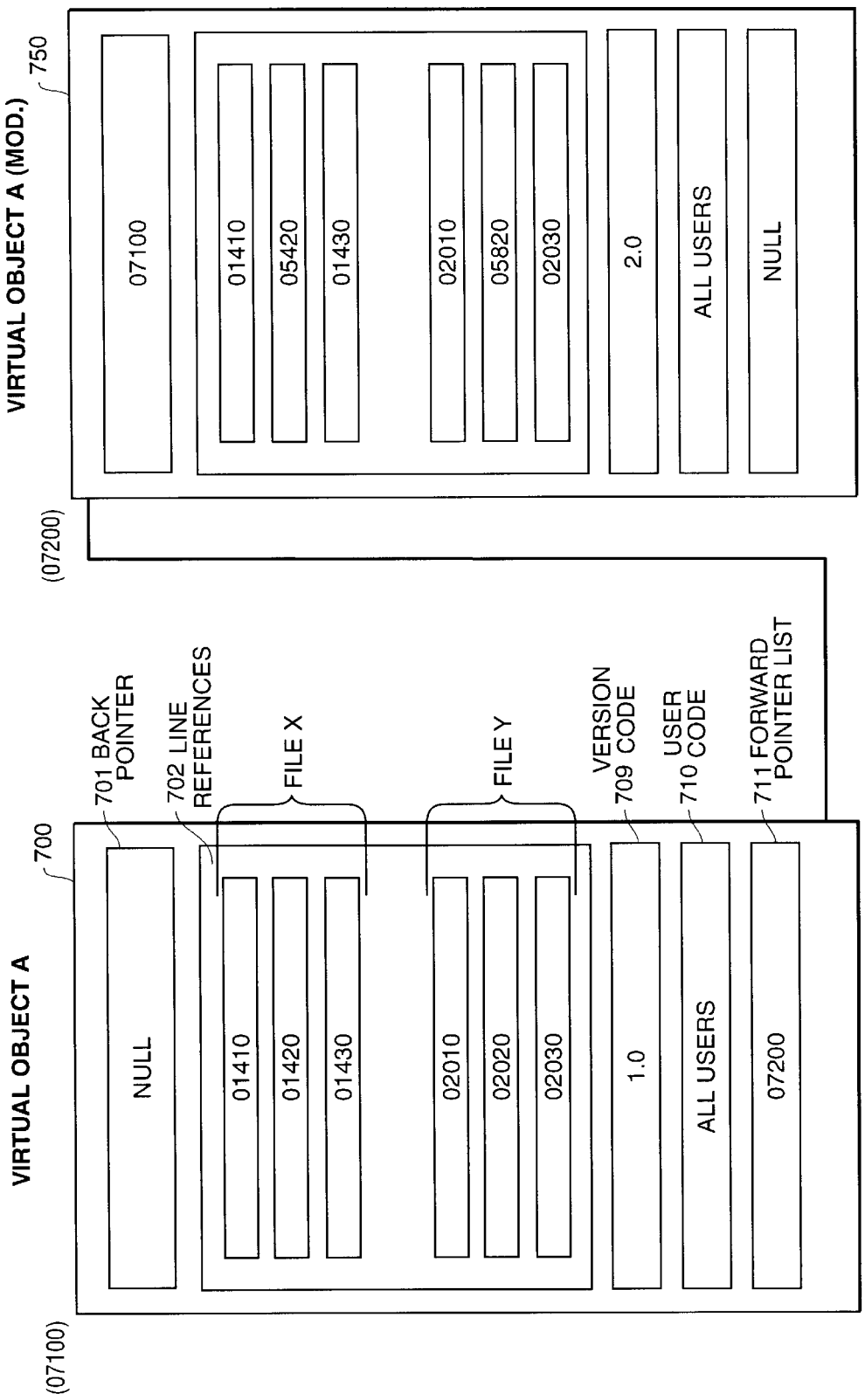
FIG. 7 is a block diagram for explaining the structure and organization of the virtual objects shown in FIG. 4 according to the invention.

FIG. 7 provides a block diagram for illustrating an example of one of virtual objects 403 according to the present invention. Similar to. virtual files 402, virtual objects 403 also provide a means for abstractly organizing and efficiently accessing related groups of source code lines 401.

As shown in FIG. 7, version 700 of virtual objects A contains back pointer 701 to indicate the preceding version of virtual object A from which version 700 was derived. In this example, back pointer 701 has the value of "null" which indicates that version 700 is the initial version of virtual object A. Similar to virtual files 402, each of virtual objects 403 contains a series of line references 702 each of which contain a memory address location which points to a specific version of one of source code lines 401.

Also similar to virtual files 402, each of virtual objects 403 contains version code 709, user code 710, and forward pointer list 711. In this example, version code 709 of version 700 has a value of "1.0" which indicates that it is the first "official" integrated version of virtual object A. In addition, user code 710 of version 700 indicates that all users have access to this version for viewing and/or modification. Forward pointer list 711 of version 700 has a value of "07200" which indicates that subsequent version 750 of virtual object A was derived from version 700.

Therefore, it can be seen that virtual objects 403 are very similar to virtual files 402, with the exception that line references 702 of each of virtual objects 403 can contain memory address locations of a group of source code lines 401 which also are contained in more than one of virtual files 402. For instance, the first three line references 702 in version 700 are directed to three source code lines 401 that are also referenced in one of virtual files 402 known as "file X". The last three lines of line references 702 of version 700 are directed to three source code lines.401 that are also referenced in one of virtual files 402 known as "file Y". In this manner, virtual objects 403 allow a user to group together in one data entity certain sets of source code lines 401 referenced in various virtual files 402 in order to collect together every one of source code lines 401 which is related to a particular functionality. Therefore, if one aspect of a functionality of an overall software system is represented in one of virtual files 402 and a second aspect of the same functionality is represented in another of virtual files 402, a user can collect all related aspects of the functionality together in one virtual object 403 for efficient software development and maintenance.

Returning to FIG. 7, version 750 of virtual object A represents a modified and integrated version which was derived from version 700. Specifically, back pointer 701 has a value of "07100" which indicates that this version was derived from version 700. Line references 702 of version 750 indicate that the second and fourth line references have been modified to indicate that they now point to different versions of source code lines 401. User code 709 of version code 750 has a value of "2.0" which indicates that this is the second integrated "official" version of virtual object A. User code 710 of version 750 also contains the value "all users", thereby providing access to version 750 for all users for viewing and/or modification. Forward pointer list 711 of version 750 contains the value "null" which indicates that there are no subsequent versions of virtual object A which were derived from version 750. In this manner, it can be appreciated that a user can utilize one of virtual objects 403 in order to abstractly organize and efficiently access groups of source code lines 401 which also are referenced in a plurality of virtual files 402, thereby encapsulating each of source code lines 401 related to a system level functionality within one data entity for software development and maintenance.

Figure 8:
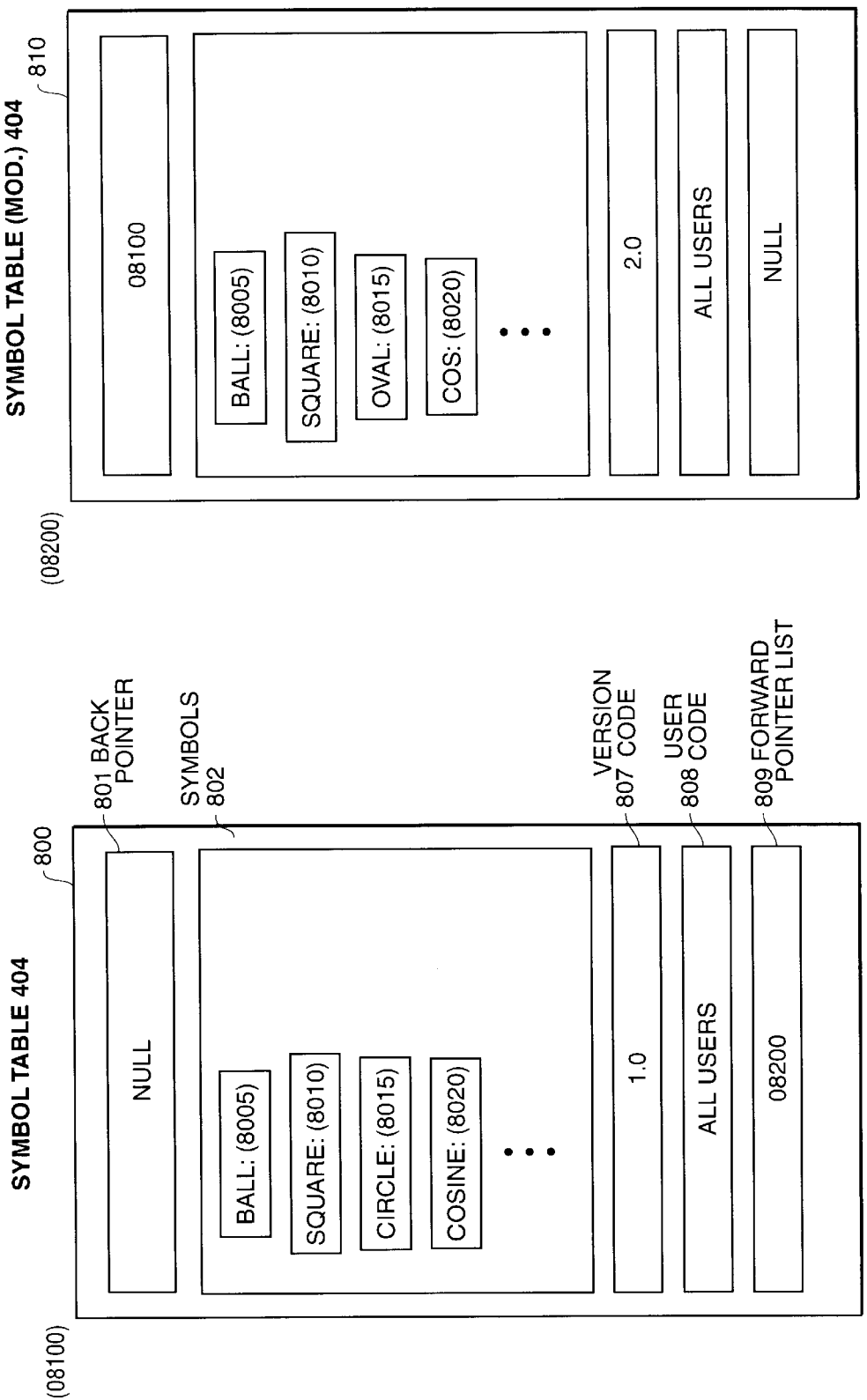
FIG. 8 is a block diagram for explaining the structure and organization of the symbol tables shown in FIG. 4 according to the invention.

FIG. 8 provides an illustration of symbol table 404 which are also stored in source code storage 270 of server 20. Unlike source code lines 401, virtual files 402 and virtual objects 403, there is only one symbol table 404; however, symbol table 404 is capable of having numerous versions in order to provide historical tracking of symbol table 404. Specifically, FIG. 8 shows initial version 800 of symbol table 404 which is located at a memory address location having the value of "08100". Every version of symbol table 404 has back pointer 801 to indicate the previous version of symbol table 404 from which the current version was derived. In this example, back pointer 801 of version 800 has a value of "null", thereby indicating that version 800 is the initial version of symbol table 404. Symbols 802 are provided in each version of symbol table 404 in order to provide a reference list for every symbol used in source code lines 401. A symbol can be a word, a variable, a function name, etc.

For example, symbols 802 of version 800 contain the symbols "ball", "square", "circle" and "cosine". These symbols represent either variable names or the names of functions which are utilized in source code lines 401. For instance, "ball", "square" and "circle" in symbols 802 of version 800 represent variable names which are utilized in one or more of source code lines 401. The symbol "cosine"

is the label of a function which is provided in one or more of source code lines 401. These symbols have corresponding numeric references of 8005, 8010, 8015 and 8020, respectively. The purpose of symbols 802 is to replace each symbol in each one of source code lines 401 with a corresponding numeric reference, thereby reducing the storage space necessary for source code lines 401. Symbol table 404 also has historical versions to allow for tracking of subsequent changes to each particular symbol so that all other source code lines 401 which reference that particular symbol will be modified automatically when they are decompressed to adopt the new, modified symbol name.

Similar to virtual files 402 and virtual objects 403, each version of symbol table 404 has version code 807, user code 808, and forward pointer list 809. Version 800 depicted in FIG. 8 has a version code 807 of "1.0", indicating that this is the first integrated "official" version of symbol table 404. Accordingly, user code 808 of version 800 has the value "all users", indicating that all users can access and/or modify version 800. Lastly, forward pointer list 809 of version 800 has the value "08200" which indicates that subsequent version 810 was derived from version 800. Subsequent version 810 of symbol table 404 is located at memory address location having the value "08200". Back pointer 801 of version 810 has the value "08100" which points to version 800, thereby indicating that version 810 was derived from version 800. Symbols 802 of version 810 indicate that two of the symbols, "circle" and "cosine", have been changed to "oval" and "cos", although they still retain the corresponding numeric references of 8015 and 8020, respectively. Therefore, each of source code lines 401 that contains a reference to "circle" or "cosine" automatically will be updated at the time of decompression to contain "oval" or "cos", as the case may be.

In the preferred embodiment, this change will have been effected by a user performing software development on one or more of source code line 401 which contain the initial references to these symbols. When source code lines 401 are compressed and canonized, the symbols in source code lines 401 are replaced with numeric references which are cross-referenced to symbols 802 in symbol table 404. Upon decompression, each of source code lines 401 is populated with symbols corresponding to the numeric references pursuant to symbol table 404, thereby updating source code lines 401 with new, modified symbols.

In this manner, a particular symbol or function name need only be changed once in the symbol table, after which each one of source code lines 401 that utilizes the changed symbol will be updated at the time of decompression to include the new symbol. It can be appreciated that the service provided by symbol table 404 allows for more efficient software development and maintenance and prevents fewer errors at the time of compilation of source code lines 401. In addition, use of numeric references in symbol table 404 reduces storage space necessary for source code lines 401 and thereby results in faster transfer of compressed source code lines between server 20 and workstations 30 and 40.

Returning to FIG. 8, it can be seen that version 810 of symbol table 404 has version code 807 of "2.0" which indicates that it is the second integrated "official" version of symbol table 404. Accordingly, user code 808 has a value of "all users", thereby indicating that version 810 can be accessed and/or modified by all users. Lastly, forward pointer list 809 of version 800 has a value of "null", thereby indicating that there are no further subsequent versions of symbol table 404 which were derived from version 810.

Figure 9:
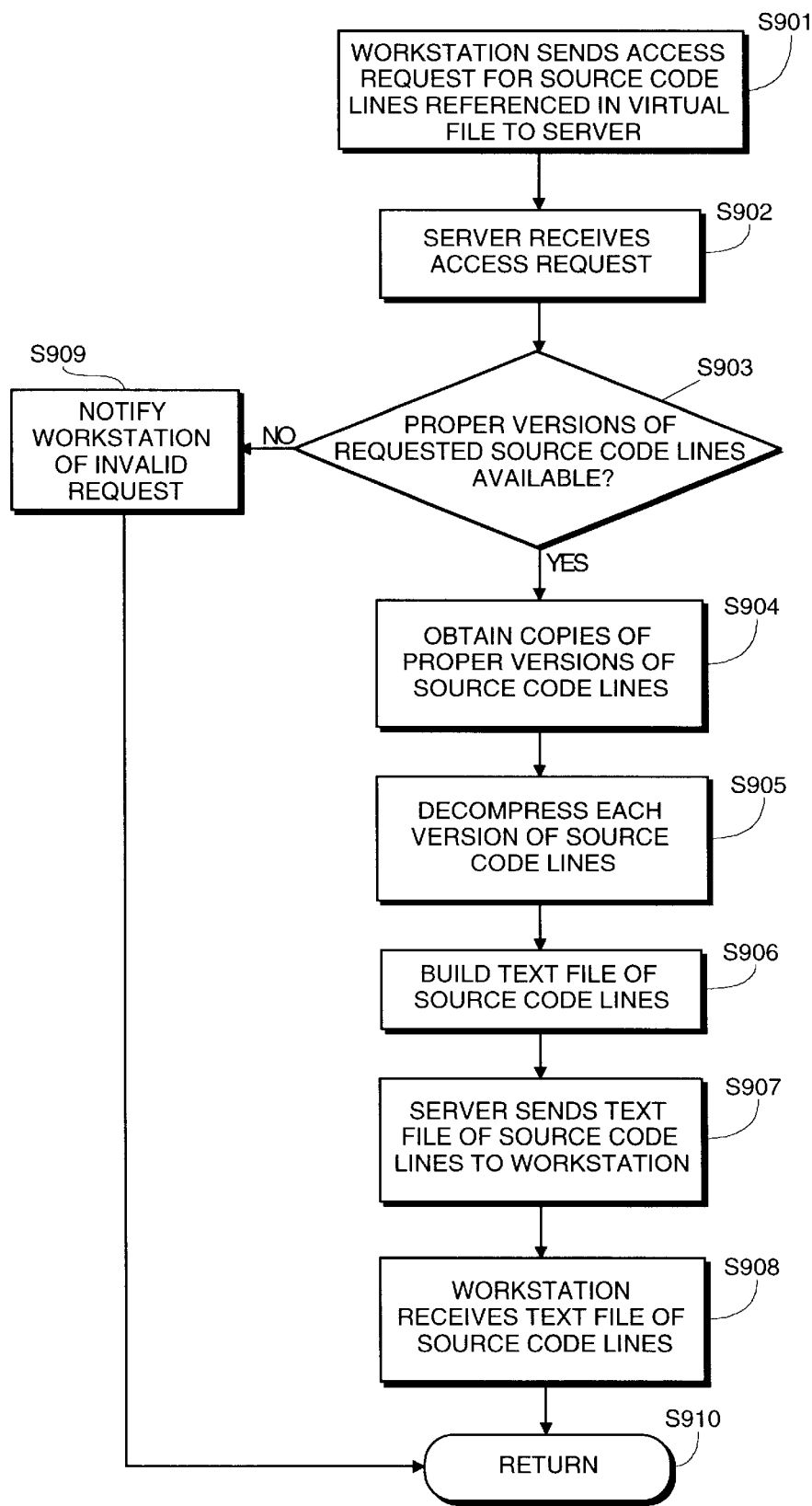
FIG. 9 is a flowchart for providing an explanation of the accessing of source code lines shown in FIG. 4 according to the invention.

FIG. 9 is a flowchart illustrating the manner in which source code lines 401 are accessed and provided to a user in the networked computing environment according to the present invention. The version control system of the present invention allows multiple users engaged in software development to access and edit software source code lines 401 without the need to "check out" a traditional software file as is the case in conventional file-based version control systems. The present invention allows multiple users to access and edit source code lines 401 from their own respective workstations, such as workstations 30 and 40 depicted in FIG. 1, without the need for any special software in the workstations except for a typical text editor, such as text editor 370. It can be appreciated that source code lines can be accessed in this manner for purposes other than editing, such as compiling, pre-processing, processing, and other typical software uses.

Specifically, referring to FIG. 9, the user at workstation 30 sends an access request for source code lines referenced in one of virtual files 402 to server 20 (step S901). In the preferred embodiment, this request is generated and sent out by typical file access I/O (input/out) functions provided by operating system 350 of workstation 30. Thus, a user may enter the request by means of keyboard 36 or pointing device 37 into workstation 30, upon which the request is sent from workstation 30 over LAN 10 to server 20 for processing.

Next, in step S902 server 20 receives the request, after which it is determined whether the source code lines referenced in the virtual file are available to send to workstation 30 (step S903). In the preferred embodiment,.access to, and maintenance of, source code lines 401 is managed by version control server module 280 on server disk 25 of server 20. Specifically, version control server module 280 analyzes the requested source code lines to determine if an appropriate version of each requested source code line is available to send to workstation 30. Version control server module 280 analyzes the memory address location provided for each of the requested source code lines referenced in the virtual file, determines whether a version of the requested source code line 401 exists at that location, and then determines if there are subsequent versions which were derived from that version by inspecting the version's forward pointer list 504.

Preferably, version control server module 280 will obtain a copy of the most recent version of each requested source code line 401 that was modified by that particular user, or if no such version exists, a copy of the most recent integrated "official" version, or if no such version exists, a copy of the initial version of the requested source code line.

Returning to step S903 of FIG. 9, if version control server module 280 determines that one or more of the requested source code lines are not available or that the user at workstation 30 is not allowed access to one or more of the requested source code lines, a notification is sent from server 20 to workstation 30 in order to notify the user at workstation 30 that the access request is invalid (step S909), after which control is directed to return in step S910. If, however, the appropriate versions of the requested source code lines are available, version control server module 280 generates a copy of each of the appropriate versions of the requested source code lines according to the priority of selection discussed above (step S904).

In the preferred mode, source code 501 in each version of source code lines 401 is in a compressed, canonical format while stored in source code storage 70. As discussed earlier in reference to FIG. 5, each of source code lines 401 is compressed in a canonical format by replacing empty spaces taken up by indents, tabs and blank character spaces with a corresponding code. In addition, words and symbols are replaced with corresponding numeric references from symbol table 404. Therefore, version control server module 280 decompresses source code 501 of each copied version of requested source lines into a decompressed, non-canonical format (step S905) and then places the decompressed source code lines into a conventional text file, such as ASCII (step S906). In step S907, server 20 sends the text file of source code lines to workstation 30 via LAN 10 using typical file I/O functions. Workstation 30 receives the text file of copied versions of the requested source code lines in step S908. Workstation 30 can then display the source code lines on display 32 of workstation 30 for viewing, modify them by utilizing text editor 370, compile them with a conventional compiler, pre-process them, or perform some other operation on them.

Figure 10:
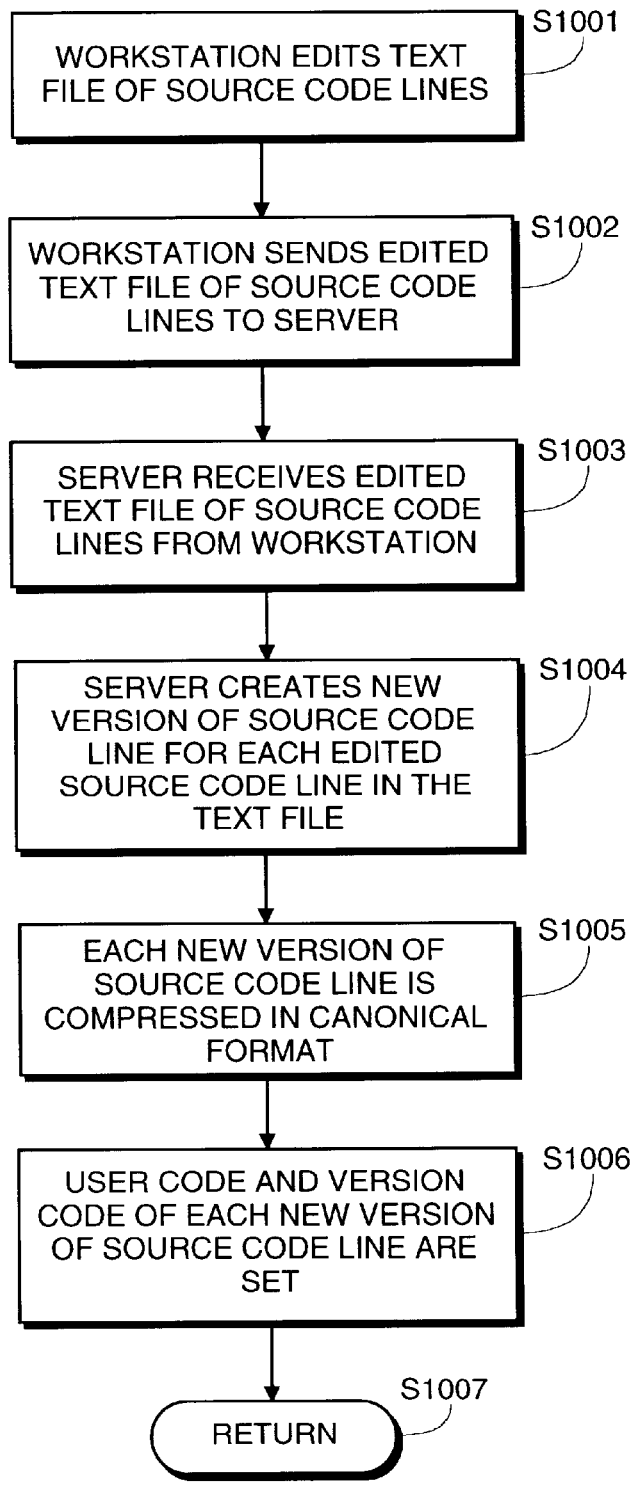
FIG. 10 is a flowchart for providing an explanation of the editing and saving of source code lines shown in FIG. 4 according to the invention.

FIG. 10 is a flowchart for illustrating the manner in which a received text file of requested source code lines can be edited and then saved. In the preferred mode, text editor 370 can be used to control the display of the received text file of the requested source code lines and to allow the user at workstation 30 to edit the requested source code lines and/or to create new source code lines (step S1001). In step S1001 the user at workstation 30 proceeds to edit the requested source code lines and/or to create new source code lines with text editor 370. When editing is complete, the user at workstation 30 enters a save command to save the text file to server 20. The save command is processed by text editor 370 in the normal manner, and the text file is then sent to server 20 using normal file I/O (step S1002).

In step S1003, server 20 receives the edited text file of edited and/or newly-created source code lines from workstation 30. In the preferred embodiment, version control server module 280 receives the text file of source code lines sent from workstation 30. Version control server module 280 then determines whether each of the source code lines in the text file is a modified version of one of currently-existing source code lines 401 or whether it is a newly-created source code line to be added to source code lines 401 (step S1004). In either case, a new version of source code line 401 is created for the edited and/or newly-created source code lines received from workstation 30 (step S1004). The source code contained in each received source code line is compressed into a canonical format before being stored in the newly-created version (step S1005).

Next, version code 502 and user code 503 of the new versions are set to properly identify, and to control access to, the new version (step S1006). If the received source code line is a newly-created source code line, version code 502 of the new version is set to a value of "1.0" to indicate that this is the initial version for that source code line. On the other hand, if the received source code line is a modified version of one of previously-existing source code lines 401, version code 502 is preferably set to the next sequential value of version code which is greater than that of the preceding version. In addition, user code 503 of the new version is set to the name of the user at workstation 30 who modified or created the version. Also, in the preferred mode, back pointer 500 of the new version is set to indicate the memory address location of the preceding version of the source code line in the case that the new version is a modified version and not a newly-created source code line. Otherwise, back pointer 500 is set to the value "null". Furthermore, forward pointer list 504 of the preceding version is modified to include the memory address location of the new version. Control is then passed to step S910 in which control is returned.

Thus, it can be seen that the present invention provides a manner in which multiple users in a networked computing environment can access source code lines 401 to make their respective changes to one or more source code lines 401 without disturbing the work of the other users. In addition, users can utilize virtual files 402 in order to efficiently access a plurality of source code lines 401 on a functional level. In this manner, source code lines 401 may be provided to users in a transparently traditional manner in what would appear to the users as a "traditional file" of source code lines 401.

It also can be appreciated that a user at workstation 30 may receive a different set of source code lines 401 when referencing one of virtual files 402 than the set of source code lines 401 which are received by a user at workstation 40 when referencing the same virtual file 402. This is because of the priority of selection of versions for each requested source code line as described above. Even though the same one of virtual files 402 contains the same line references 602 to a given set of source code lines 401, version control server module 280 first will select for each user the most recent version of that source code line which was modified by that respective user. Therefore, some of source code lines 401 sent to workstation 30 may include several versions which were recently modified by the user at workstation 30, while some of source code lines 401 sent to workstation 40 may include several versions which were instead recently modified by the user at workstation 40. To each user, however, the use of the same one of virtual files 402 operates in the same transparent manner.

Figure 11:
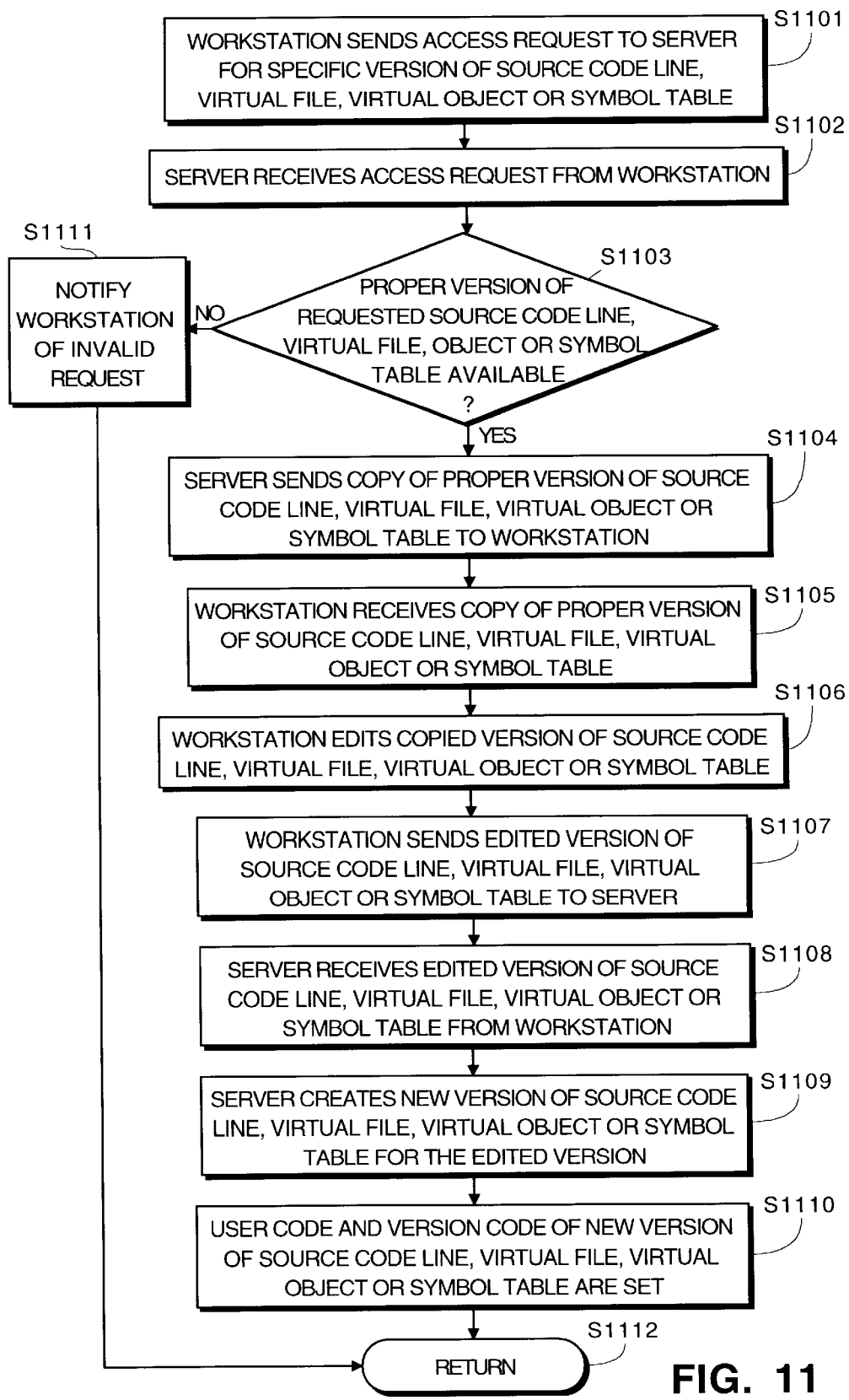
FIG. 11 is a flowchart for providing an explanation of the access and modification of source code lines, virtual files, virtual objects and symbol tables shown in FIG. 4 according to a second embodiment of the invention.

In the preferred mode, the present invention also provides the capability for some of the workstations to have special editor 380 which allows a user to access, edit and integrate specified versions of source code lines 401, virtual files 402, virtual objects 403 and/or symbol table 404. This capability would preferably be limited to the workstations of software developers and/or system administrators, thereby providing them with access to all versions of source code lines 401, as well as the other aforementioned software components. Special editor 380 preferably contains a version control client module which interacts with version control server module 280. FIG. 11 is a flowchart which provides an illustration of the accessing and editing of source code lines 401, virtual files 402, virtual objects 403 and/or symbol table 404 using special editor 380. First, in step S1101 a user at workstation 30 utilizes special editor 380 to request access to a specific version of one or more of source code lines 401, virtual files 402, virtual objects 403 or symbol table 404. In the preferred mode, special editor 380 receives the user's request via keyboard 36 or pointing device 37, formulates an access request, and then sends the access request to server 20 via LAN 10 (step S1101).

Next, in step S1102, server 20 receives the request for access from workstation 30. Server 20 then determines whether or not the requested version of source code lines 401, virtual files 402 or virtual objects 403 or of symbol table 404 exists in step S1103. Preferably, this determination is performed by version control server module 280. If the requested version does not exist, a notification of the invalid access request is sent to workstation 30 in step S1111 and control is thereafter passed to return in step S1112. If, however, the requested version does exist, server 20 generates a copy of the requested version of source code lines 401, virtual files 402, virtual objects 403 or symbol table 404, as the case may be, and sends the copied version to workstation 30 via LAN 10 (step S1104). Preferably, requested copies of source code lines 401 are sent to workstation 30 in compressed, canonical format to expedite transfer over LAN 10.

In step S1105 workstation 30 receives the copied version of source code lines 401, virtual files 402, virtual objects 403 or symbol table 404, as the case may be. The copied version is then provided to special editor 380 and displayed on display 32 for viewing and/or editing by the user at workstation 30 (step S1106). Preferably, the display and editing of the copied version are controlled by special editor 380 (step S1106). After the user at workstation 30 has indicated completion of the editing session to special editor 380, workstation 30 prepares and sends the edited version back to server 20, preferably in a compressed, canonical format (step S1107). Server 20 receives the edited version in step S1108, after which server 20 creates a new version of the one or more source code lines 401, virtual files 402, virtual objects 403 or symbol table 404 in step S1109, in which the edited version is stored. Again, in the preferred embodiment, the functions described above in steps S1108 and S1109 are carried out by version control server module 280. Next, version code 502 and user code 503 of the new version are set accordingly (step S1110). Specifically, one of version codes 502, 607, 709 or 807 of the new version of source code lines 401, virtual files 402, virtual objects 403 or symbol table 404, as the case may be, is set to a next-higher sequential value to indicate that this version is a modified version of the previous version. In addition, one of user codes 503, 608, 710 or 808, as the case may be, is set to indicate a value corresponding to the user who modified the new version of source code lines 401, virtual files 402, virtual objects 403 or symbol table 404, as the case may be.

Also, in the preferred embodiment, one of back pointers 500, 601, 701 or 801 of the new version, as the case may be, and one of forwarding pointer lists 504, 609, 711 or 809 of the preceding version, as the case may be, are modified to indicate the preceding version and subsequent versions, respectively. Control is then passed to return in step S1112.

Figure 12:
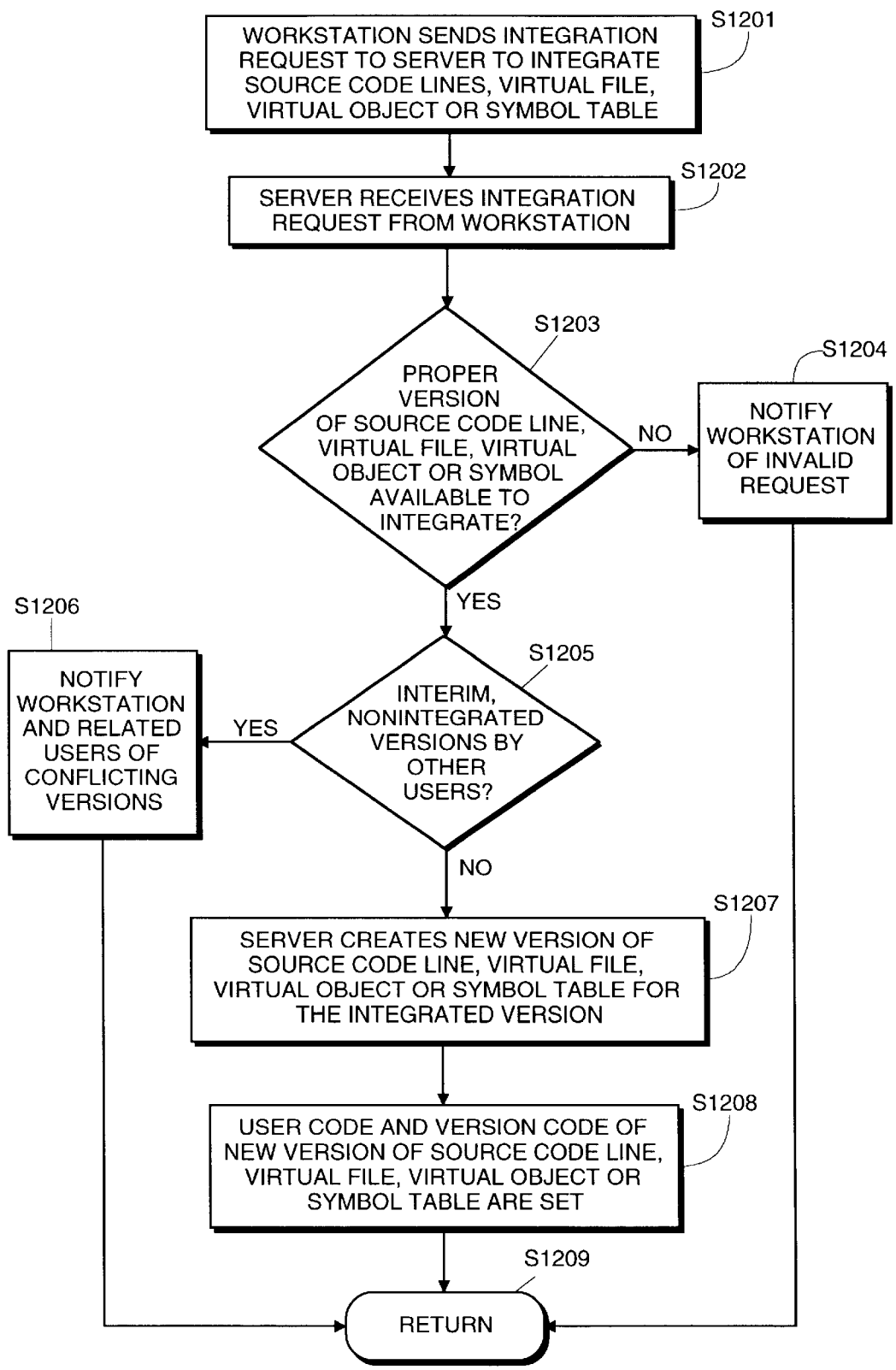
FIG. 12 is a flowchart for providing an explanation of the integration of source code lines, virtual files, virtual objects and symbol tables shown in FIG. 4 according to a second embodiment of the invention.

In a similar manner, a preferred embodiment of the present invention also allows a user at a workstation having special editor 380 to request integration of specific versions of source code lines 401, virtual files 402, virtual objects 403 or symbol table 404. FIG. 12 is a flowchart which provides an illustration of the integration of a version of source code lines 401, virtual files 402, virtual objects 403 or symbol table 404.

Specifically, in FIG. 12, a user at workstation 30 utilizes special editor 380 to request that a specific version of one of source code lines 401, virtual files 402, virtual objects 403 or symbol table 404 is to be integrated (step S1201). Next, server 20 receives the integration request from workstation 30 in step S1202. Server 20 then determines whether the requested version of source code lines 401, virtual files 402, virtual objects 403 or symbol table 404 exists and if so, whether the requesting user has access to that version (step S1203). If the version does not exist or the user does not have access to the requested version, server 20 notifies workstation 30 of the invalid integration request in step S1204, after which control is passed to return in step S1209.

If, however, the requested version does exist and is accessible to the requesting user for integration, control is passed to step S1205 in which a determination is made whether there are other interim, non-integrated versions of the requested source code lines 401, virtual files 402, virtual objects 403 or symbol table 404, as the case may be, since the last integrated "official" version. If there are such interim versions, control passes to step S1206 in which server 20 sends a notification to workstation 30, as well as to the other users who made the interim, non-integrated versions, that the integration request has been made and that it is invalid.

In this manner, the users who have made modifications to the same source code line, virtual file, virtual object or symbol table can meet and resolve the differences between their modified versions before the next integrated version is created. Control then passes from step S1206 to return in step S1209.

If, however, there are no other interim versions since the last integrated version of the item to be integrated, the server creates a new integrated version in step S1207 by copying the requested version of one of source code lines 401, virtual files 402, virtual objects 403 or symbol table 404. Next, in step S1208, server 20 sets user code 503, 608, 710 or 808 and version code 502, 607, 709 or 807 of the newly-integrated version of source code lines 401, virtual files 402, virtual objects 403 or symbol table 404, as the case may be, to indicate that the new version is an integrated "official" version (step S1208). Specifically, a user code equal to "all users" is set to indicate that all users now have access to this integrated "official" version for viewing and/or modification. In addition, a version code of the next-highest integrated value ending in "0.0" is set to indicate that this is the most recent integrated version. In the preferred embodiment, back pointer 500, 601, 701 or 801 of the new version and forward pointer list 504, 609, 711 or 809 of the preceding version are also set to point to the preceding version and to the new integrated version, respectively. In this manner, a user having proper access to special editor 380 can access, edit and integrate a version of one or more of source code lines 401, virtual files 402, virtual objects 403 or symbol table 404 while at the same time maintaining version control and historical tracking.

According to the above, the present invention provides a version control system for maintaining software source code on a line-by-line basis for use during the development and maintenance of software source code by multiple software developers in a networked computing environment. The present invention avoids excessive use and waste of memory space for version control because it only maintains and stores a new version of a source code line if that line is modified. In addition, the source code lines are stored in a compressed, canonical format. The version control system also provides concurrent access to the software source code lines for modification by multiple software developers, thereby avoiding delays which are commonly experienced when using a file-based traditional version control system in which a user "locks-out" all source code lines in a file when making a modification to any one of those source code lines. The version control system provides the ability for software developers of workstations to access source code lines in a conventional fashion without the need for special software. The source code lines can be grouped together on a functional basis by using virtual files and virtual objects to facilitate organized and functional-based software development. Special editing capabilities are also provided in the version control system to allow certain software developers and/or system administrators with access to all versions of source code lines, virtual files, virtual objects and symbol tables.

Lastly, the version control system of the present invention maintains access control and historical tracking of all versions of source code lines in an organized and efficient fashion. Although the above description is directed to use of the present invention for version control of software source code lines in a networked computing environment, it should be recognized that the present invention is not-limited to such an application and can be used in other applications using other computers and computing devices, such as the version control of data in a data system or the version control of text as in a large multi-author publishing environment.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A method for version control of source code arranged into a plurality of source code lines, the plurality of source code lines maintained within a computer device having a memory, the computer device being accessible to a plurality of software developers, said method comprising the steps of:

receiving an access request to access the source code on a line-by-line basis;

accessing, in response to said access request, at least one of the plurality of source code lines, wherein the plurality of source code lines are stored within a source code storage which is located within the memory, the source code storage arranged to store a plurality of versions of each of the plurality of source code lines;

generating, in response to the access request, a copy of at least one of the plurality of versions of the accessed source code lines;

receiving at least one edited source code line; and storing, in the source code storage, a new version of source code line corresponding to each of the edited source code lines received, wherein each of the versions contains information on a version of related source code lines.

2. A method according to claim 1, wherein each of the plurality of versions of each of the plurality of source code lines has a corresponding version code which contains information that identifies the version of the source code line to which the version code corresponds, and wherein the version code is stored within the source code storage.

3. A method according to claim 2, wherein, in the case that the at least one edited source code line is a modification of one of the plurality of versions of one of the plurality of source code lines, the information contained in the version code corresponding to the new version of source code line identifies the new version as a successor version to the version of the source code line that was modified.

4. A method according to claim 2, wherein, in the case that the at least one edited source code line is a new source code line, the information contained in the version code corresponding to the new version of source code line identifies the new version as an initial version.

5. A method according to claim 2, wherein the generating step copies the version of each of the accessed source code lines which has a corresponding version code containing information identifying the version as the most recent version of the accessed source code line.

6. A method according to claim 1, wherein said access request is initiated from a requesting software developer, wherein the requesting software developer is one of the plurality of software developers.

7. A method according to claim 6, wherein each of the plurality of versions of each of the plurality of source code lines has a corresponding user code which contains information related to the identity of at least one of the plurality of software developers, and wherein the user code is stored within the source code storage.

8. A method according to claim 7, wherein the generating step copies the version of each of the accessed source code lines which has a corresponding user code containing information related to the identity of the requesting software developer.

9. A method according to claim 7, wherein the at least one edited source code line is received from one of the plurality of software developers, and wherein the new version of source code line corresponding to each of the edited source code lines has a corresponding user code which contains information relating to the identity of the software developer from whom the at least one edited source code line was received.

10. A method according to claim 7, further comprising the step of integrating at least one of the plurality of versions of at least one of the plurality of source code lines, wherein the information contained in the user code corresponding to each of the plurality of versions of source code lines that are integrated is modified to relate to the identity of each of the plurality of software developers.

11. A method according to claim 1, further comprising the step of storing a plurality of virtual files within the source code storage, each of the plurality of virtual files containing a plurality of line references, each of the plurality of line references corresponding to one of the plurality of source code lines, the source code storage arranged to store a plurality of versions of each of the plurality of virtual files, and wherein the generating step copies one of the plurality of versions of each source code line that corresponds to each of the plurality of line references contained in one of the plurality of virtual files.

12. A method according to claim 11, further comprising the steps of generating, in response to an access request, a copy of at least one of the plurality of versions of one of the plurality of virtual files, receiving an edited virtual file, and storing, in the source code storage, a new version of virtual file corresponding to the edited virtual file received.

13. A method according to claim 1, further comprising the step of storing a plurality of virtual objects within the source code storage, each of the plurality of virtual objects containing a plurality of line references, each of the plurality of line references corresponding to one of the plurality of source code lines, the source code storage arranged to store a plurality of versions of each of the plurality of virtual objects, and wherein the generating step copies one of the plurality of versions of each source code line that corresponds to each of the plurality of line references contained in one of the plurality of virtual objects.

14. A method according to claim 13, further comprising the steps of generating, in response to an access request, a copy of at least one of the plurality of versions of one of the plurality of virtual objects, receiving an edited virtual object, and storing, in the source code storage, a new version of virtual object corresponding to the edited virtual object received.

15. A method according to claim 1, further comprising the step of storing a symbol table within the source code storage, the symbol table containing a plurality of symbols, the source code storage arranged to store a plurality of versions of the symbol table, and wherein the generating step copies each of the plurality of symbols contained in one of the plurality of versions of the symbol table.

16. A method according to claim 15, further comprising the steps of generating, in response to an access request, a copy of at least one of the plurality of versions of the symbol table, receiving, an edited symbol table, and storing, in the source code storage, a new version of symbol table corresponding to the edited symbol table received.

17. A method according to claim 1, wherein each of the versions of each of the plurality of source code lines is stored in the source code storage in a compressed, canonical format, and wherein the generating step generates a copy of at least one of the plurality of versions of the accessed source code lines in an uncompressed, non-canonical format.

18. A method according to claim 1, wherein each of the plurality of versions of each of the plurality of source code lines has a pointer, the pointer comprising a memory location corresponding to a predecessor version of the same source code line in the case that a predecessor version exists, and the pointer comprising a null value in the case that a predecessor version of the same source code line does not exist.

19. A method for version control of source code arranged into a plurality of source code lines, the plurality of source code lines maintained within a computer device having a memory, the computer device being accessible to a plurality of software developer, said method comprising the steps of:

receiving an access request to access the source code on a line-by-line basis;

accessing, in response to said access request, at least one of the plurality of source code lines, wherein the plurality of source code lines are stored within a source code storage which is located within the memory, the source code storage arranged to store a plurality of versions of each of the plurality of source code lines, wherein each version of each source code line is stored in a compressed, canonical format, has a version code which contains information that identifies the version, the version code being stored within the source code storage, and has a user code which contains information describing the identity of at least one of the plurality of software developers, the user code being stored within the source code storage, and has a line data which contains information describing at least one of related source code lines, the line data being stored within the source code storage;

generating, in response to the access request, a copy of at least one of the plurality of versions of each of the accessed source code lines in an uncompressed, non-canonical format, wherein the version code of each of the copied versions contains information identifying the version as the most recently stored version and wherein the user code of each of the copied versions contains information relating to the identity of at least one of the plurality of software developers;

receiving at least one edited source code line;

storing, in the source code storage, a new version of source code line corresponding to each of the edited source code lines received;

modifying the information contained in the user code of each new version of source code line, whereby the information is modified to relate to the identity of one of the plurality of software developers;

modifying the information contained in the line data of each new version of source code lines and at least one of the related source code lines, whereby the information is modified to relate the new version code to the version code of at least one of the related source code lines; and modifying the information contained in the version code of each new version of source code line, whereby the information is modified to identify the new version as the most recent version of the source code line.

20. A method for editing source code which is arranged into a plurality of source code lines which are stored in a source code storage, the source code storage arranged to store a plurality of versions of each of the plurality of source code lines, wherein the source code storage is accessible to a plurality of software developers, said method comprising the steps of:

sending an access request to the source code storage, the access request containing a reference to at least one of the plurality of source code lines stored in the source code storage;

receiving from the source code storage, in response to the access request, a copy of at least one of the plurality of versions of each source code line referenced in the access request, each copied version being received in an uncompressed, non-canonical format, wherein each of the versions contains information on a version of related source code lines;

modifying at least one of the copied versions of source code lines received from the source code storage, thereby creating at least one edited source code line; and sending to the source code storage the at least one edited source code line.

21. A method according to claim 20, wherein a plurality of virtual files are stored within the source code storage, each of the plurality of virtual files containing a plurality of line references, each of the plurality of line references corresponding to one of the plurality of source code lines, the source code storage arranged to store a plurality of versions of each of the plurality of virtual files, wherein the reference contained in the access request to at least one of the plurality of source code lines comprises a reference to one of the plurality of virtual files, and wherein a copy is received of at least one of the plurality of versions of each source code line corresponding to each of the plurality of line references contained in the virtual file referenced in the access request.

22. A method according to claim 21, further comprising the steps of:

receiving, from the source code storage, a copy of at least one of the plurality of versions of at least one of the plurality of virtual files;

modifying at least one of the copied versions of virtual files received from the source code storage, thereby creating at least one edited virtual file; and sending, to the source code storage, the at least one edited virtual file.

23. A method according to claim 20, wherein a plurality of virtual objects are stored within the source code storage, each of the plurality of virtual objects containing a plurality of line references, each of the plurality of line references corresponding to one of the plurality of source code lines, the source code storage arranged to store a plurality of versions of each of the plurality of virtual objects, wherein the reference contained in the access request to at least one of the plurality of source code lines comprises a reference to one of the plurality of virtual objects, and wherein a copy is received of at least one of the plurality of versions of each source code line corresponding to each of the plurality of line references contained in the virtual object referenced in the access request.

24. A method according to claim 23, further comprising the steps of:

receiving, from the source code storage, a copy of at least one of the plurality of versions of at least one of the plurality of virtual objects;

modifying at least one of the copied versions of virtual objects received from the source code storage, thereby creating at least one edited virtual object; and sending, to the source code storage, the at least one edited virtual object.

25. A method according to claim 20, wherein a symbol table is stored within the source code storage, the symbol table containing a plurality of symbols, the source code storage arranged to store a plurality of versions of the symbol table, and further comprising the steps of receiving from the source code storage a copy of at least one of the plurality of versions of the symbol table, modifying at least one of the copied versions of the symbol table, thereby creating at least one edited symbol table, and sending to the source code storage the at least one edited symbol table.

26. A computing device for version control of source code arranged into a plurality of source code lines, the computer device being accessible to a plurality of software developers, said computing device comprising:
   a memory; and
   a processor that (i) receives an access request to access the source code on a line-by-line basis, (ii) accesses, in response to said access request, at least one of the plurality of source code lines, wherein the plurality of source code lines are stored within a source code storage which is located within the memory, the source code storage arranged to store a plurality of versions of each of the plurality of source code lines, (iii) generates, in response to the access request, a copy of at least one of the plurality of versions of the accessed source code lines, wherein each of the versions contains information on a version of related source code lines, (iv) receives at least one edited source code line, (v) stores, in the source code storage, a new version of source code line corresponding to each of the edited source code lines received.

27. A computing device according to claim 26, wherein each of the plurality of versions of each of the plurality of source code lines has a corresponding version code which contains information that identifies the version of the source code line to which the version code corresponds, and wherein the version code is stored within the source code storage.

28. A computing device according to claim 27, wherein, in the case that the at least one edited source code line is a modification of one of the plurality of versions of one of the plurality of source code lines, the information contained in the version code corresponding to the new version of source code line identifies the new version as a successor version to the version of the source code line that was modified.

29. A computing device according to claim 27, wherein, in the case that the at least one edited source code line is a new source code line, the information contained in the version code corresponding to the new version of source code line identifies the new version as an initial version.

30. A computing device according to claim 27, wherein the generating step copies the version of each of the accessed source code lines which has a corresponding version code containing information identifying the version as the most recent version of the accessed source code line.

31. A computing device according to claim 26, wherein said access request is initiated from a requesting software developer, wherein the requesting software developer is one of the plurality of software developers.

32. A computing device according to claim 31, wherein each of the plurality of versions of each of the plurality of source code lines has a corresponding user code which contains information related to the identity of at least one of the plurality of software developers, and wherein the user code is stored within the source code storage.

33. A computing device according to claim 32, wherein the at least one edited source code line is received from one of the plurality of software developers, and wherein the new version of source code line corresponding to each of the edited source code lines has a corresponding user code which contains information relating to the identity of the software developer from whom the at least one edited source code line was received.

34. A computing device according to claim 31, wherein the generating step copies the version of each of the accessed source code lines which has a corresponding user code containing information related to the identity of the requesting software developer.

35. A computing device according to claim 31, wherein the processor further comprises the step to integrate at least one of the plurality of versions of at least one of the plurality of source code lines, wherein the information contained in the user code corresponding to each of the plurality of versions of source code lines that are integrated is modified to relate to the identity of each of the plurality of software developers.

36. A computing device according to claim 26, wherein the processor further comprises the step to store a plurality of virtual files within the source code storage, each of the plurality of virtual files containing a plurality of line references, each of the plurality of line references corresponding to one of the plurality of source code lines, the source code storage arranged to store a plurality of versions of each of the plurality of virtual files, and wherein the generating step copies one of the plurality of versions of each source code line that corresponds to each of the plurality of line references contained in one of the plurality of virtual files.

37. A computing device according to claim 36, wherein the processor further comprises the steps to generate, in response to an access request, a copy of at least one of the plurality of versions of one of the plurality of virtual files, receive an edited virtual file, and store, in the source code storage, a new version of virtual file corresponding to the edited virtual file received.

38. A computing device according to claim 26, wherein the processor further comprises the step to store a plurality of virtual objects within the source code storage, each of the plurality of virtual objects containing a plurality of line references, each of the plurality of line references corresponding to one of the plurality of source code lines, the source code storage arranged to store a plurality of versions of each of the plurality of virtual objects, and wherein the generating step copies one of the plurality of versions of each source code line that corresponds to each of the plurality of line references contained in one of the plurality of virtual objects.

39. A computing device according to claim 38, wherein the processor further comprises the steps to generate, in response to an access request, a copy of at least one of the plurality of versions of one of the plurality of virtual objects, receive an edited virtual object, and store, in the source code storage, a new version of virtual object corresponding to the edited virtual object received.

40. A computing device according to claim 26, wherein the processor further comprises the step to store a symbol table within the source code storage, the symbol table containing a plurality of symbols, the source code storage arranged to store a plurality of versions of the symbol table, and wherein the generating step copies each of the plurality of symbols contained in one of the plurality of versions of the symbol table.

41. A computing device according to claim 40, wherein the processor further comprises the steps to generate, in response to an access request, a copy of at least one of the plurality of versions of the symbol table, receive, an edited symbol table, and store, in the source code storage, a new version of symbol table corresponding to the edited symbol table received.

42. A computing device according to claim 26, wherein each of the versions of each of the plurality of source code lines is stored in the source code storage in a compressed, canonical format, and wherein the generating step generates a copy of at least one of the plurality of versions of the accessed source code lines in an uncompressed, non-canonical format.

43. A computing device according to claim 26, wherein each of the plurality of versions of each of the plurality of source code lines has a pointer, the pointer comprising a memory location corresponding to a predecessor version of the same source code line in the case that a predecessor version exists, and the pointer comprising a null value in the case that a predecessor version of the same source code line does not exist.

44. A computing device for version control of source code arranged into a plurality of source code lines, the computer device being accessible to a plurality of software developers, said computing device comprising:
a memory; and
a processor that (i) receives an access request to access the source code on a line-by-line basis, (ii) accesses, in response to the access request, at least one of the plurality of source code lines, wherein the plurality of source code lines are stored within a source code storage which is located within the memory, the source code storage arranged to store a plurality of versions of each of the plurality of source code lines, wherein each version of each source code line is stored in a compressed, canonical format, has a version code which contains information that identifies the version, the version code being stored within the source code storage, has a user code which contains information describing the identity of at least one of the plurality of software developers, the user code being stored within the source code storage, and has a line data which contains information describing at least one of related source code lines, the line data being stored within the source code storage, (iii) generates, in response to the access request, a copy of at least one of the plurality of versions of each of the accessed source code lines in an uncompressed, non-canonical format, wherein the version code of each of the copied versions contains information identifying the version as the most recently stored version and wherein the user code of each of the copied versions contains information relating to the identity of at least one of the plurality of software developers, (iv) receives at least one edited source code line, (v) stores, in the source code storage, a new version of source code line corresponding to each of the edited source code lines received, (vi) modifies the information contained in the user code of each new version of source code line, whereby the information is modified to relate to the identity of one of the plurality of software developers, (vii) modifies the information contained in the line data of each new version of source code lines and at least one of the related source code lines, whereby the information is modified to relate the new version code to the version code of at least one of the related source code lines, and (viii) modifies the information contained in the version code of each new version of source code line, whereby the information is modified to identify the new version as the most recent version of the source code line.

45. A computing device for editing source code which is arranged into a plurality of source code lines which are stored in a source code storage, the source code storage arranged to store a plurality of versions of each of the plurality of source code lines, wherein the source code storage is accessible to a plurality of software developers, said computing device comprising:
a memory; and
a processor that (i) sends an access request to the source code storage, the access request containing a reference to at least one of the plurality of source code lines stored in the source code storage, (ii) receives from the source code storage, in response to the access request, a copy of at least one of the plurality of versions of each source code line referenced in the access request, each copied version being received in an uncompressed, non-canonical format, wherein each of the versions contains information on a version of related source code lines, (iii) modifies at least one of the copied versions of source code lines received from the source code storage, thereby creating at least one edited source code line and (iv) sends to the source code storage the at least one edited source code line.

46. A computing device according to claim 45, wherein a plurality of virtual files are stored within the source code storage, each of the plurality of virtual files containing a plurality of line references, each of the plurality of line references corresponding to one of the plurality of source code lines, the source code storage arranged to store a plurality of versions of each of the plurality of virtual files, wherein the reference contained in the access request to at least one of the plurality of source code lines comprises a reference to one of the plurality of virtual files, and wherein a copy is received of at least one of the plurality of versions of each source code line corresponding to each of the plurality of line references contained in the virtual file referenced in the access request.

47. A computing device according to claim 46, wherein the processor further comprises the steps to:
receive, from the source code storage, a copy of at least one of the plurality of versions of at least one of the plurality of virtual files;
modify, at least one of the copied versions of virtual files received from the source code storage, thereby creating at least one edited virtual file; and
send, to the source code storage, the at least one edited virtual file.

48. A computing device according to claim 45, wherein a plurality of virtual objects are stored within the source code storage, each of the plurality of virtual objects containing a plurality of line references, each of the plurality of line references corresponding to one of the plurality of source code lines, the source code storage arranged to store a plurality of versions of each of the plurality of virtual objects, wherein the reference contained in the access request to at least one of the plurality of source code lines comprises a reference to one of the plurality of virtual objects, and wherein a copy is received of at least one of the plurality of versions of each source code line corresponding to each of the plurality of line references contained in the virtual object referenced in the access request.

49. A computing device according to claim 48, wherein the processor further comprises the steps to:

receive, from the source code storage, a copy of at least one of the plurality of versions of at least one of the plurality of virtual objects;

modify at least one of the copied versions of virtual objects received from the source code storage, thereby creating at least one edited virtual object; and send to the source code storage the at least one edited virtual object.

50. A computing device according to claim 45, wherein a symbol table is stored within the source code storage, the symbol table containing a plurality of symbols, the source code storage arranged to store a plurality of versions of the symbol table, and wherein the processor further comprises the steps to receive from the source code storage a copy of at least one of the plurality of versions of the symbol table, modify at least one of the copied versions of the symbol table, thereby creating at least one edited symbol table, and send to the source code storage the at least one edited symbol table.

51. Computer-executable process steps stored on a computer-readable medium, the computer-executable process steps for version control of source code arranged into a plurality of source code lines, the plurality of source code lines maintained within a computer device having a memory, the computer device being accessible to a plurality of software developers, said computer-executable process steps comprising:

code to receive an access request to access the source code on a line-by-line basis;

code to access, in response to said access request, at least one of the plurality of source code lines, wherein the plurality of source code lines are stored within a source code storage which is located within the memory, the source code storage arranged to store a plurality of versions of each of the plurality of source code lines;

code to generate, in response to the access request, a copy of at least one of the plurality of versions of the accessed source code lines;

code to receive at least one edited source code line; and code to store, in the source code storage, a new version of source code line corresponding to each of the edited source code lines received, wherein each of the versions contains information on a version of related source code lines.

52. Computer-executable process steps according to claim 51, wherein each of the plurality of versions of each of the plurality of source code lines has a corresponding version code which contains information that identifies the version of the source code line to which the version code corresponds, and wherein the version code is stored within the source code storage.

53. Computer-executable process steps according to claim 52, wherein, in the case that at least one edited source code line is a modification of one of the plurality of versions of one of the plurality of source code lines, the information contained in the version code corresponding to the new version of source code line identifies the new version as a successor version to the version of the source code line that was modified.

54. Computer-executable process steps according to claim 52, wherein, in the case that the at least one edited source code line is a new source code line, the information contained in the version code corresponding to the new version of source code line identifies the new version as an initial version.

55. Computer-executable process steps according to claim 52, wherein the code to generate step copies the version of each of the accessed source code lines which has a corresponding version code containing information identifying the version as the most recent version of the accessed source code line.

56. Computer-executable process steps according to claim 51, wherein said access request is initiated from a requesting software developer, wherein the requesting software developer is one of the plurality of software developers.

57. Computer-executable process steps according to claim 56, wherein each of the plurality of versions of each of the plurality of source code lines has a corresponding user code which contains information related to the identity of at least one of the plurality of software developers, and wherein the user code is stored within the source code storage.

58. Computer-executable process steps according to claim 57, wherein the generating step copies the version of each of the accessed source code lines which has a corresponding user code containing information related to the identity of the requesting software developer.

59. Computer-executable process steps according to claim 57, wherein the at least one edited source code line is received from one of the plurality of software developers, and wherein the new version of source code line corresponding to each of the edited source code lines has a corresponding user code which contains information relating to the identity of the software developer from whom the at least one edited source code line was received.

60. Computer-executable process steps according to claim 57, further code to integrate at least one of the plurality of versions of at least one of the plurality of source code lines, wherein the information contained in the user code corresponding to each of the plurality of versions of source code lines that are integrated is modified to relate to the identity of each of the plurality of software developers.

61. Computer-executable process steps according to claim 51, further comprising code to store a plurality of virtual files within the source code storage, each of the plurality of virtual files containing a plurality of line references, each of the plurality of line references corresponding to one of the plurality of source code lines, the source code storage arranged to store a plurality of versions of each of the plurality of virtual files, and wherein the code to generate copies one of the plurality of versions of each source code line that corresponds to each of the plurality of line references contained in one of the plurality of virtual files.

62. Computer-executable process steps according to claim 61, further comprising code to generate, in response to an access request, a copy of at least one of the plurality of versions of one of the plurality of virtual files, code to receive an edited virtual file, and code to store, in the source code storage, a new version of virtual file corresponding to the edited virtual file received.

63. Computer-executable process steps according to claim 51, further comprising code to store a plurality of virtual objects within the source code storage, each of the plurality of virtual objects containing a plurality of line references, each of the plurality of line references corresponding to one of the plurality of source code lines, the source code storage arranged to store a plurality of versions of each of the plurality of virtual objects, and wherein the code to generate copies one of the plurality of versions of each source code line that corresponds to each of the plurality of line references contained in one of the plurality of virtual objects.

64. Computer-executable process steps according to claim 51, further comprising code to store a symbol table within the source code storage, the symbol table containing a plurality of symbols, the source code storage arranged to store a plurality of versions of the symbol table, and wherein the code to generate copies each of the plurality of symbols contained in one of the plurality of versions of the symbol table.

65. Computer-executable process steps according to claim 64, further comprising code to generate, in response to an access request, a copy of at least one of the plurality of versions of the symbol table, code to receive, an edited symbol table, and code to store, in the source code storage, a new version of symbol table corresponding to the edited symbol table received.

66. Computer-executable process steps according to claim 51, wherein each of the versions of each of the plurality of source code lines is stored in the source code storage in a compressed, canonical format, and wherein the code to generate generates a copy of at least one of the plurality of versions of the accessed source code lines in an uncompressed, non-canonical format.

67. Computer-executable process steps according to claim 63, further comprising code to generate, in response to an access request, a copy of at least one of the plurality of versions of one of the plurality of virtual objects, code to receive an edited virtual object, and code to store, in the source code storage, a new version of virtual object corresponding to the edited virtual object received.

68. Computer-executable process steps according to claim 51, wherein each of the plurality of versions of each of the plurality of source code lines has a pointer, the pointer comprising a memory location corresponding to a predecessor version of the same source code line in the case that a predecessor version exists, and the pointer comprising a null value in the case that a predecessor version of the same source code line does not exist.

69. Computer-executable process steps stored on a computer-readable medium, the computer-executable process steps for version control of source code arranged into a plurality of source code lines, the plurality of source code lines maintained within a computer device having a memory, the computer device being accessible to a plurality of software developers, said computer-executable process steps comprising:
   code to receive an access request to access the source code on a line-by-line basis;
   code to access, in response to said access request, at least one of the plurality of source code lines, wherein the plurality of source code lines are stored within a source code storage which is located within the memory, the source code storage arranged to store a plurality of versions of each of the plurality of source code lines, wherein each version of each source code line is stored in a compressed, canonical format, has a version code which contains information that identifies the version, the version code being stored within the source code storage, and has a user code which contains information describing the identity of at least one of the plurality of software developers, the user code being stored within the source code storage, and has a line data which contains information describing at least one of related source code lines, the line data being stored within the source code storage;
   code to generate, in response to the access request, a copy of at least one of the plurality of versions of each of the accessed source code lines in an uncompressed, non-canonical format, wherein the version code of each of the copied versions contains information identifying the version as the most recently stored version and wherein the user code of each of the copied versions contains information relating to the identity of at least one of the plurality of software developers;
   code to receive at least one edited source code line;
   code to store, in the source code storage, a new version of source code line corresponding to each of the edited source code lines received;
   code to modify the information contained in the user code of each new version of source code line, whereby the information is modified to relate to the identity of one of the plurality of software developers;
   code to modify the information contained in the line data of each new version of source code lines and at least one of the related source code lines, whereby the information is modified to relate the new version code to the version code of at least one of the related source code lines; and
   code to modify the information contained in the version code of each new version of source code line, whereby the information is modified to identify the new version as the most recent version of the source code line.

70. Computer-executable process steps stored on a computer-readable medium, the computer-executable process steps for editing source code which is arranged into a plurality of source code lines which are stored in a source code storage, the source code storage arranged to store a plurality of versions of each of the plurality of source code lines, wherein the source code storage is accessible to a plurality of software developers, said computer-executable process steps comprising:
   code to send an access request to the source code storage, the access request containing a reference to at least one of the plurality of source code lines stored in the source code storage;
   code to receive from the source code storage, in response to the access request, a copy of at least one of the plurality of versions of each source code line referenced in the access request, each copied version being received in an uncompressed, non-canonical format, wherein each of the versions contains information on a version of related source code lines;
   code to modify at least one of the copied versions of source code lines received from the source code storage, thereby creating at least one edited source code line; and
   code to send to the source code storage the at least one edited source code line.

71. Computer-executable process steps according to claim 70, wherein a plurality of virtual files are stored within the source code storage, each of the plurality of virtual files containing a plurality of line references, each of the plurality of line references corresponding to one of the plurality of source code lines, the source code storage arranged to store a plurality of versions of each of the plurality of virtual files, wherein the reference contained in the access request to at least one of the plurality of source code lines comprises a reference to one of the plurality of virtual files, and wherein a copy is received of at least one of the plurality of versions of each source code line corresponding to each of the plurality of line references contained in the virtual file referenced in the access request.

72. Computer-executable process steps according to claim 71, further comprising code to:
   receive, from the source code storage, a copy of at least one of the plurality of versions of at least one of the plurality of virtual files;

modify at least one of the copied versions of virtual files received from the source code storage, thereby creating at least one edited virtual file; and send, to the source code storage, the at least one edited virtual file.

73. Computer-executable process steps according to claim 70, wherein a plurality of virtual objects are stored within the source code storage, each of the plurality of virtual objects containing a plurality of line references, each of the plurality of line references corresponding to one of the plurality of source code lines, the source code storage arranged to store a plurality of versions of each of the plurality of virtual objects, wherein the reference contained in the access request to at least one of the plurality of source code lines comprises a reference to one of the plurality of virtual objects, and wherein a copy is received of at least one of the plurality of versions of each source code line corresponding to each of the plurality of line references contained in the virtual object referenced in the access request.

74. Computer-executable process steps according to claim 73, further comprising code to:

receive, from the source code storage, a copy of at least one of the plurality of versions of at least one of the plurality of virtual objects;

modify at least one of the copied versions of virtual objects received from the source code storage, thereby creating at least one edited virtual object; and send, to the source code storage, the at least one edited virtual object.

75. Computer-executable process steps according to claim 70, wherein a symbol table is stored within the source code storage, the symbol table containing a plurality of symbols, the source code storage arranged to store a plurality of versions of the symbol table, and further comprising code to receive from the source code storage a copy of at least one of the plurality of versions of the symbol table, modify at least one of the copied versions of the symbol table, thereby creating at least one edited symbol table, and send to the source code storage the at least one edited symbol table.

76. A computer-readable medium which stores computer-executable process steps, the computer-executable process steps for version control of source code arranged into a plurality of source code lines, the plurality of source code lines maintained within a computer device having a memory, the computer device being accessible to a plurality of software developers, said computer-executable process steps comprising:

a receiving step to receive an access request to access the source code on a line-by-line basis;

an accessing step to access, in response to said access request, at least one of the plurality of source code lines, wherein the plurality of source code lines are stored within a source code storage which is located within the memory, the source code storage arranged to store a plurality of versions of each of the plurality of source code lines;

a generating step to generate, in response to the access request, a copy of at least one of the plurality of versions of the accessed source code lines, wherein each of the versions contains information on a version of related source code lines;

a receiving step to receive at least one edited source code line; and a storing step to store, in the source code storage, a new version of source code line corresponding to each of the edited source code lines received.

77. A computer-readable medium according to claim 76, wherein each of the plurality of versions of each of the plurality of source code lines has a corresponding version code which contains information that identifies the version of the source code line to which the version code corresponds, and wherein the version code is stored within the source code storage.

78. A computer-readable medium according to claim 77, wherein said access request is initiated from a requesting software developer, wherein the requesting software developer is one of the plurality of software developers.

79. A computer-readable medium according to claim 78, wherein each of the plurality of versions of each of the plurality of source code lines has a corresponding user code which contains information related to the identity of at least one of the plurality of software developers, and wherein the user code is stored within the source code storage.

80. A computer-readable medium according to claim 79, wherein the generating step copies the version of each of the accessed source code lines which has a corresponding user code containing information related to the identity of the requesting software developer.

81. A computer-readable medium according to claim 79, wherein the at least one edited source code line is received from one of the plurality of software developers, and wherein the new version of source code line corresponding to each of the edited source code lines has a corresponding user code which contains information relating to the identity of the software developer from whom the at least one edited source code line was received.

82. A computer-readable medium according to claim 79, further comprising the step of integrating at least one of the plurality of versions of at least one of the plurality of source code lines, wherein the information contained in the user code corresponding to each of the plurality of versions of source code lines that are integrated is modified to relate to the identity of each of the plurality of software developers.

83. A computer-readable medium according to claim 77, wherein, in the case that the at least one edited source code line is a modification of one of the plurality of versions of one of the plurality of source code lines, the information contained in the version code corresponding to the new version of source code line identifies the new version as a successor version to the version of the source code line that was modified.

84. A computer-readable medium according to claim 77, wherein, in the case that the at least one edited source code line is a new source code line, the information contained in the version code corresponding to the new version of source code line identifies the new version as an initial version.

85. A computer-readable medium according to claim 77 wherein the generating step copies the version of each of the accessed source code lines which has a corresponding version code containing information identifying the version as the most recent version of the accessed source code line.

86. A computer-readable medium according to claim 76, further comprising the step of storing a plurality of virtual files within the source code storage, each of the plurality of virtual files containing a plurality of line references, each of the plurality of line references corresponding to one of the plurality of source code lines, the source code storage arranged to store a plurality of versions of each of the plurality of virtual files, and wherein the generating step copies one of the plurality of versions of each source code line that corresponds to each of the plurality of line references contained in one of the plurality of virtual files.

87. A computer-readable medium according to claim 86, further comprising the steps of generating, in response to an access request, a copy of at least one of the plurality of versions of one of the plurality of virtual files, receiving an edited virtual file, and storing, in the source code storage, a new version of virtual file corresponding to the edited virtual file received.

88. A computer-readable medium according to claim 76, further comprising the step of storing a plurality of virtual objects within the source code storage, each of the plurality of virtual objects containing a plurality of line references, each of the plurality of line references corresponding to one of the plurality of source code lines, the source code storage arranged to store a plurality of versions of each of the plurality of virtual objects, and wherein the generating step copies one of the plurality of versions of each source code line that corresponds to each of the plurality of line references contained in one of the plurality of virtual objects.

89. A computer-readable medium according to claim 88, further comprising the steps of generating, in response to an access request, a copy of at least one of the plurality of versions of one of the plurality of virtual objects, receiving an edited virtual object, and storing, in the source code storage, a new version of virtual object corresponding to the edited virtual object received.

90. A computer-readable medium according to claim 76, further comprising the step of storing a symbol table within the source code storage, the symbol table containing a plurality of symbols, the source code storage arranged to store a plurality of versions of the symbol table, and wherein the generating step copies each of the plurality of symbols contained in one of the plurality of versions of the symbol table.

91. A computer-readable medium according to claim 90, further comprising the steps of generating, in response to an access request, a copy of at least one of the plurality of versions of the symbol table, receiving, an edited symbol table, and storing, in the source code storage, a new version of symbol table corresponding to the edited symbol table received.

92. A computer-readable medium according to claim 76, wherein each of the versions of each of the plurality of source code lines is stored in the source code storage in a compressed, canonical format, and wherein the generating step generates a copy of at least one of the plurality of versions of the accessed source code lines in an uncompressed, non-canonical format.

93. A computer-readable medium according to claim 76, wherein each of the plurality of versions of each of the plurality of source code lines has a pointer, the pointer comprising a memory location corresponding to a predecessor version of the same source code line in the case that a predecessor version exists, and the pointer comprising a null value in the case that a predecessor version of the same source code line does not exist.

94. A computer-readable medium which stores computer-executable process steps, the computer-executable process steps for version control of source code arranged into a plurality of source code lines, the plurality of source code lines maintained within a computer device having a memory, the computer device being accessible to a plurality of software developers, said computer-executable process steps comprising:

a receiving step to receive an access request to access the source code on a line-by-line basis;

an accessing step to access, in response to said access request, at least one of the plurality of source code lines, wherein the plurality of source code lines are stored within a source code storage which is located within the memory, the source code storage arranged to store a plurality of versions of each of the plurality of source code lines, wherein each version of each source code line is stored in a compressed, canonical format, has a version code which contains information that identifies the version, the version code being stored within the source code storage, has a user code which contains information describing the identity of at least one of the plurality of software developers, the user code being stored within the source code storage, and has a line data which contains information describing at least one of related source code lines, the line data being stored within the source code storage;

a generating step to generate, in response to the access request, a copy of at least one of the plurality of versions of each of the accessed source code lines in an uncompressed, non-canonical format, wherein the version code of each of the copied versions contains information identifying the version as the most recently stored version and wherein the user code of each of the copied versions contains information relating to the identity of at least one of the plurality of software developers;

a receiving step to receive at least one edited source code line;

a storing step to store, in the source code storage, a new version of source code line corresponding to each of the edited source code lines received;

a modifying step to modify the information contained in the user code of each new version of source code line, whereby the information is modified to relate to the identity of one of the plurality of software developers;

a modifying step to modify the information contained in the line data of each new version of source code lines and at least one of the related source code lines, whereby the information is modified to relate the new version code to the version code of at least one of the related source code lines; and a modifying step to modify the information contained in the version code of each new version of source code line, whereby the information is modified to identify the new version as the most recent version of the source code line.

95. A computer-readable medium which stores computer-executable process steps, the computer-executable process steps for editing source code which is arranged into a plurality of source code lines which are stored in a source code storage, the source code storage arranged to store a plurality of versions of each of the plurality of source code lines, wherein the source code storage is accessible to a plurality of software developers, said computer-executable process steps comprising:

a sending step to send an access request to the source code storage, the access request containing a reference to at least one of the plurality of source code lines stored in the source code storage;

a receiving step to receive from the source code storage, in response to the access request, a copy of at least one of the plurality of versions of each source code line referenced in the access request, each copied version being received in an uncompressed, non-canonical format, wherein each of the versions contains information on a version of related source code lines;

a modifying step to modify at least one of the copied versions of source code lines received from the source code storage, thereby creating at least one edited source code line; and a sending step to send to the source code storage the at least one edited source code line.

96. A computer-readable medium according to claim 95, wherein a plurality of virtual files are stored within the source code storage, each of the plurality of virtual files containing a plurality of line references, each of the plurality of line references corresponding to one of the plurality of source code lines, the source code storage arranged to store a plurality of versions of each of the plurality of virtual files, wherein the reference contained in the access request to at least one of the plurality of source code lines comprises a reference to one of the plurality of virtual files, and wherein a copy is received of at least one of the plurality of versions of each source code line corresponding to each of the plurality of line references contained in the virtual file referenced in the access request.

97. A computer-readable medium according to claim 96, further comprising the steps of:

receiving, from the source code storage, a copy of at least one of the plurality of versions of at least one of the plurality of virtual files;

modifying at least one of the copied versions of virtual files received from the source code storage, thereby creating at least one edited virtual file; and sending, to the source code storage, the at least one edited virtual file.

98. A computer-readable medium according to claim 95, wherein a plurality of virtual objects are stored within the source code storage, each of the plurality of virtual objects containing a plurality of line references, each of the plurality of line references corresponding to one of the plurality of source code lines, the source code storage arranged to store a plurality of versions of each of the plurality of virtual objects, wherein the reference contained in the access request to at least one of the plurality of source code lines comprises a reference to one of the plurality of virtual objects, and wherein a copy is received of at least one of the plurality of versions of each source code line corresponding to each of the plurality of line references contained in the virtual object referenced in the access request.

99. A computer-readable medium according to claim 98, further comprising the steps of:

receiving, from the source code storage, a copy of at least one of the plurality of versions of at least one of the plurality of virtual objects;

modifying at least one of the copied versions of virtual objects received from the source code storage, thereby creating at least one edited virtual object; and sending, to the source code storage, the at least one edited virtual object.

100. A computer-readable medium according to claim 95, wherein a symbol table is stored within the source code storage, the symbol table containing a plurality of symbols, the source code storage arranged to store a plurality of versions of the symbol table, and further comprising the steps of receiving from the source code storage a copy of at least one of the plurality of versions of the symbol table, modifying at least one of the copied versions of the symbol table, thereby creating at least one edited symbol table, and sending to the source code storage the at least one edited symbol table.

* * * * *